(12) United States Patent
Nakagata et al.

(10) Patent No.: US 8,935,536 B2
(45) Date of Patent: Jan. 13, 2015

(54) IMAGE ENCRYPTION/DECRYPTION DEVICE, METHOD, AND STORAGE MEDIUM STORING A PROGRAM

(75) Inventors: Shohei Nakagata, Kawasaki (JP); Hiroshi Iwanaga, Fukuoka (JP); Kensuke Kuraki, Kawasaki (JP); Jun Takahashi, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/290,923

(22) Filed: Nov. 7, 2011

(65) Prior Publication Data

US 2012/0121086 A1 May 17, 2012

Related U.S. Application Data

(63) Continuation of application No. PCT/JP2009/002054, filed on May 11, 2009.

(51) Int. Cl.
*H04L 29/06* (2006.01)
*G06F 12/14* (2006.01)
(Continued)

(52) U.S. Cl.
CPC .... *H04N 1/32203* (2013.01); *G06F 2221/2107* (2013.01); *H04L 63/0428* (2013.01); *G06F 21/6218* (2013.01); *G09C 5/00* (2013.01); *H04N 1/4486* (2013.01); *H04N 1/32128* (2013.01); *H04N 1/32219* (2013.01); *H04N 1/32251* (2013.01); *H04N 1/32272* (2013.01); *H04N 1/32288* (2013.01); *H04N 1/32315* (2013.01);
(Continued)

(58) Field of Classification Search
CPC ............... G06F 21/6218; G06F 2221/2107; H04L 63/0428
USPC ........ 380/30, 51, 54, 243, 246, 255; 713/165, 713/189
See application file for complete search history.

(56) References Cited

U.S. PATENT DOCUMENTS 7,415,612 B2 * 8/2008 Uchino ......................... 713/176
8,259,941 B2 * 9/2012 Yanazume .................... 380/246
(Continued)

FOREIGN PATENT DOCUMENTS

CN          1419377 A      5/2003
CN      101022549 A      8/2007
(Continued)

OTHER PUBLICATIONS

International Search Report for PCT/JP2009/002054 mailed Jun. 16, 2009.
(Continued)

*Primary Examiner* — Aravind Moorthy
(74) *Attorney, Agent, or Firm* — Staas & Halsey LLP

(57) ABSTRACT

At the time of marker attachment (at the time of encryption), for example, image conversion in which pixels to be overwritten by a marker are selected and pruned in a distributed manner and the pruning positions are moved to a marker attachment position is performed, and the marker is attached to the marker attachment position obtained as a result. At the time of marker elimination (at the time of decryption), for example, image reverse conversion in which each pixel of the marker is moved to the original position before the marker attachment is performed, each moved pixel of the marker is recovered, and the marker is eliminated.

16 Claims, 44 Drawing Sheets

(51) Int. Cl.
*H04K 1/00* (2006.01)
*H04N 1/32* (2006.01)
*G09C 5/00* (2006.01)
*H04N 1/44* (2006.01)
*G06F 21/62* (2013.01)

(52) U.S. Cl.
CPC ....... *H04N 1/32347* (2013.01); *H04N 1/32352* (2013.01)
USPC .......................... 713/189; 713/165; 380/255

(56) References Cited

U.S. PATENT DOCUMENTS

| | | | |
|---|---|---|---|
| 8,290,160 B1* | 10/2012 | Steeger | 380/243 |
| 2003/0091239 A1 | 5/2003 | Imagawa et al. | |
| 2003/0206633 A1* | 11/2003 | Uchino | 380/246 |
| 2003/0235303 A1* | 12/2003 | Evans et al. | 380/216 |
| 2007/0047828 A1* | 3/2007 | Ishii et al. | 382/232 |
| 2008/0270807 A1* | 10/2008 | Forlenza et al. | 713/193 |
| 2008/0288857 A1 | 11/2008 | Duncan et al. | |
| 2009/0257586 A1* | 10/2009 | Takahashi et al. | 380/55 |
| 2009/0262931 A1 | 10/2009 | Nakagata et al. | |
| 2009/0323950 A1* | 12/2009 | Nakagata et al. | 380/243 |
| 2010/0091337 A1 | 4/2010 | Yoshio et al. | |
| 2010/0169649 A1* | 7/2010 | Haas et al. | 713/176 |
| 2012/0076439 A1* | 3/2012 | Kurigata | 382/298 |

FOREIGN PATENT DOCUMENTS

| | | |
|---|---|---|
| CN | 101394553 A | 3/2009 |
| EP | 2079228 | 7/2009 |
| EP | 2133853 | 12/2009 |
| EP | 2410727 | 1/2012 |
| JP | 2008-301044 | 12/2008 |
| WO | WO 2008/053545 A1 | 5/2008 |
| WO | WO 2008/053576 A1 | 5/2008 |
| WO | 2008/146390 A1 | 12/2008 |

OTHER PUBLICATIONS

Chinese Office Action mailed Nov. 1, 2013 in corresponding Chinese Application No. 200980159107.8.
Extended European Search Report dated Aug. 7, 2014 in corresponding European Patent Application No. 09844563.8.

* cited by examiner

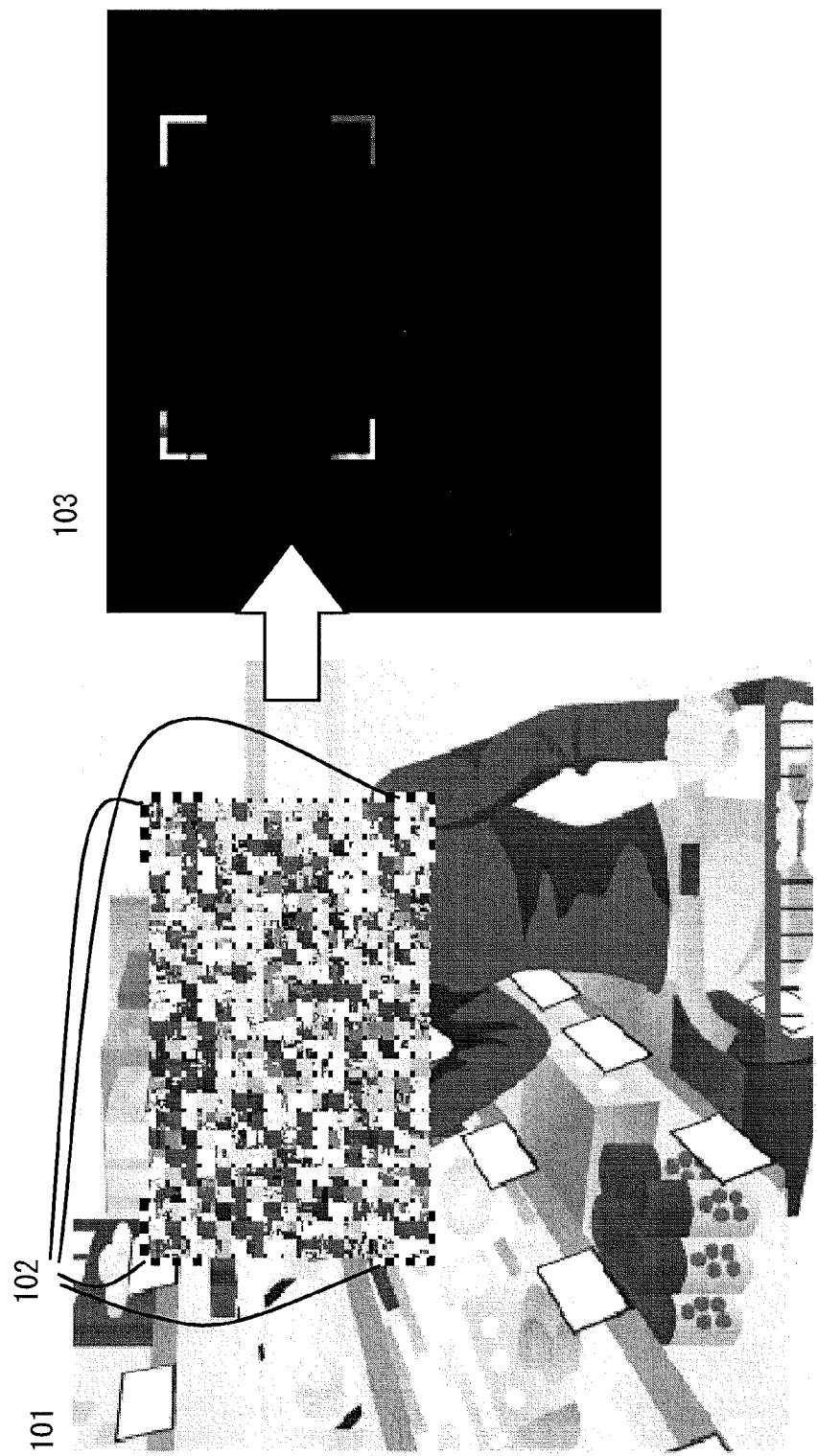

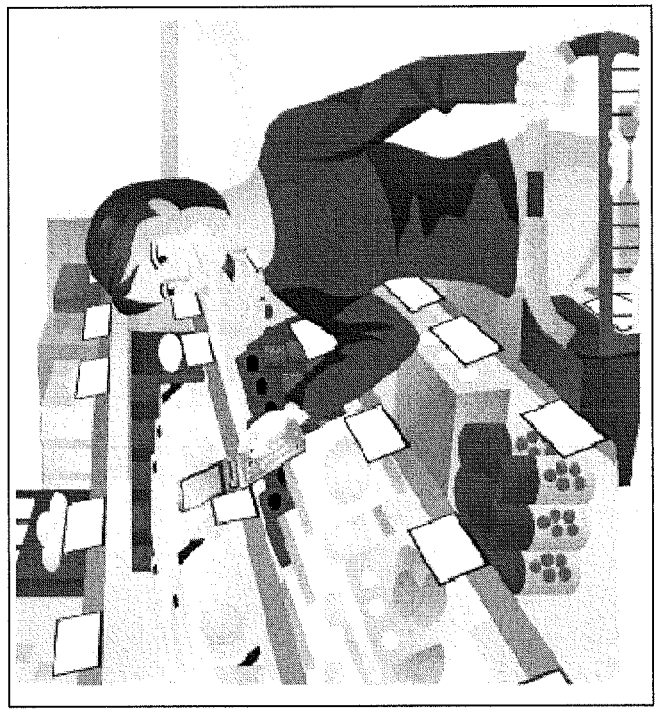
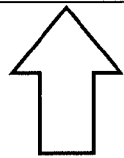
FIG. 3

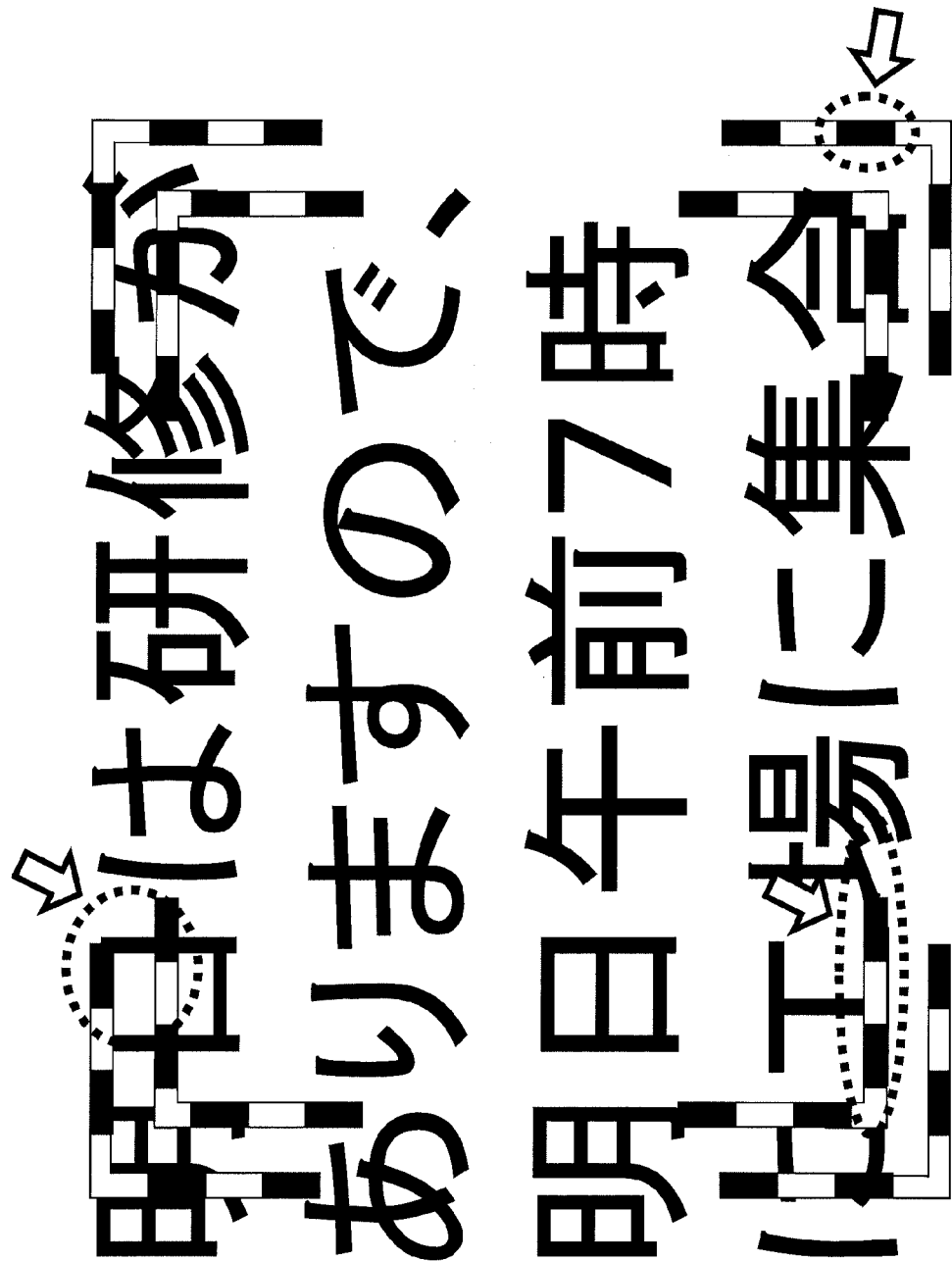
F I G. 6

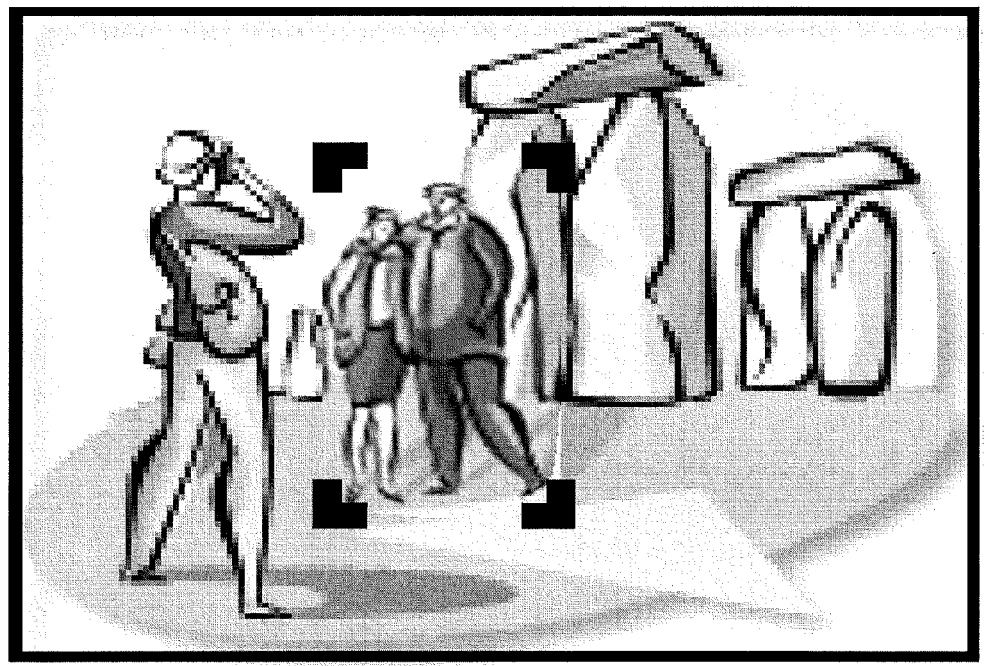
F I G. 1 4

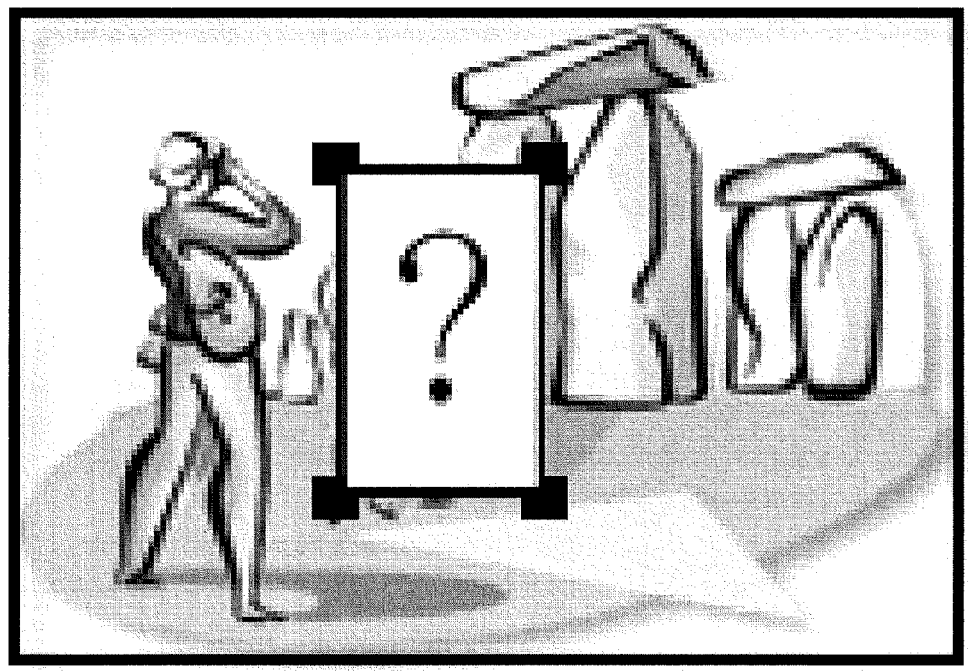
F I G. 1 5

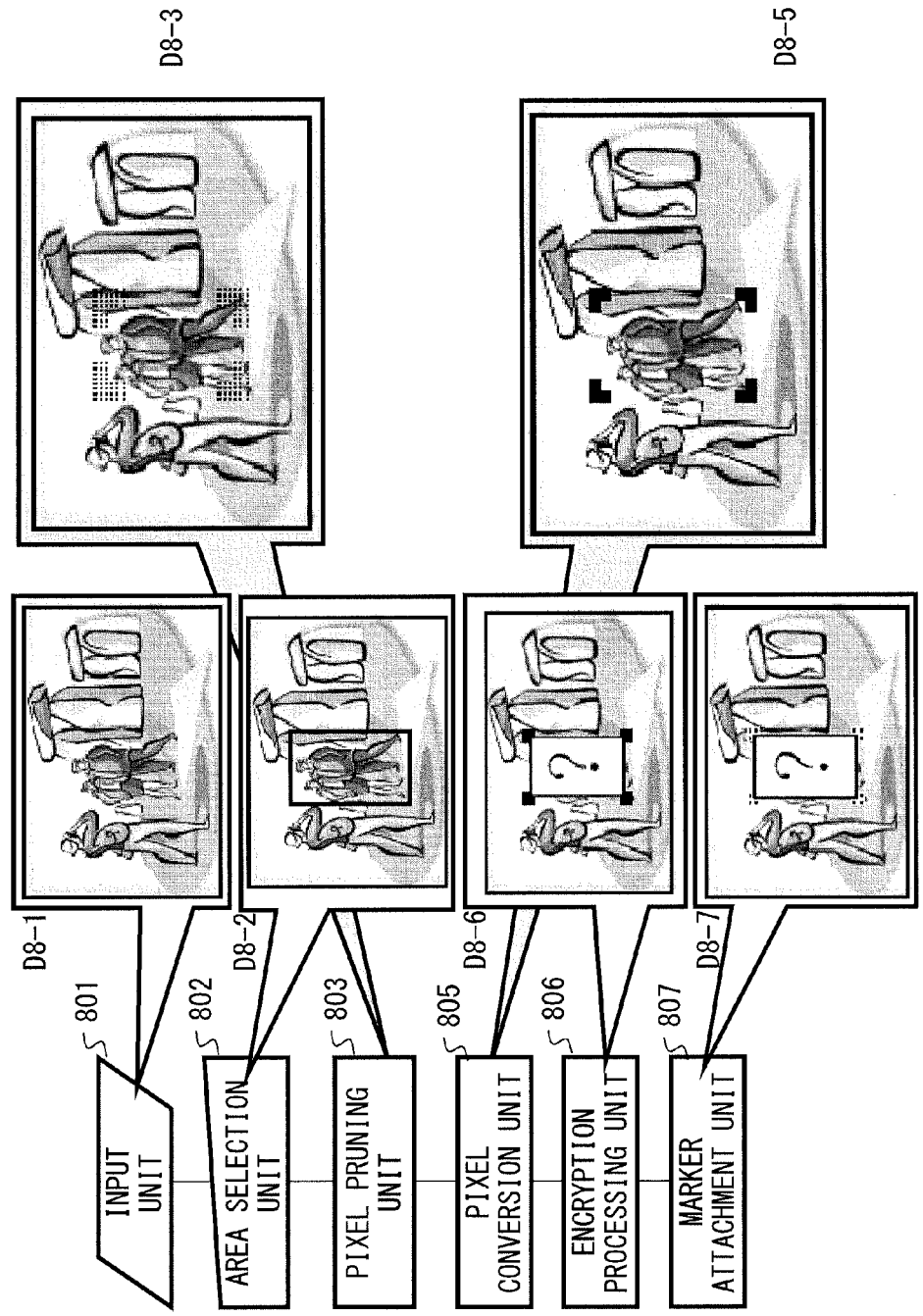

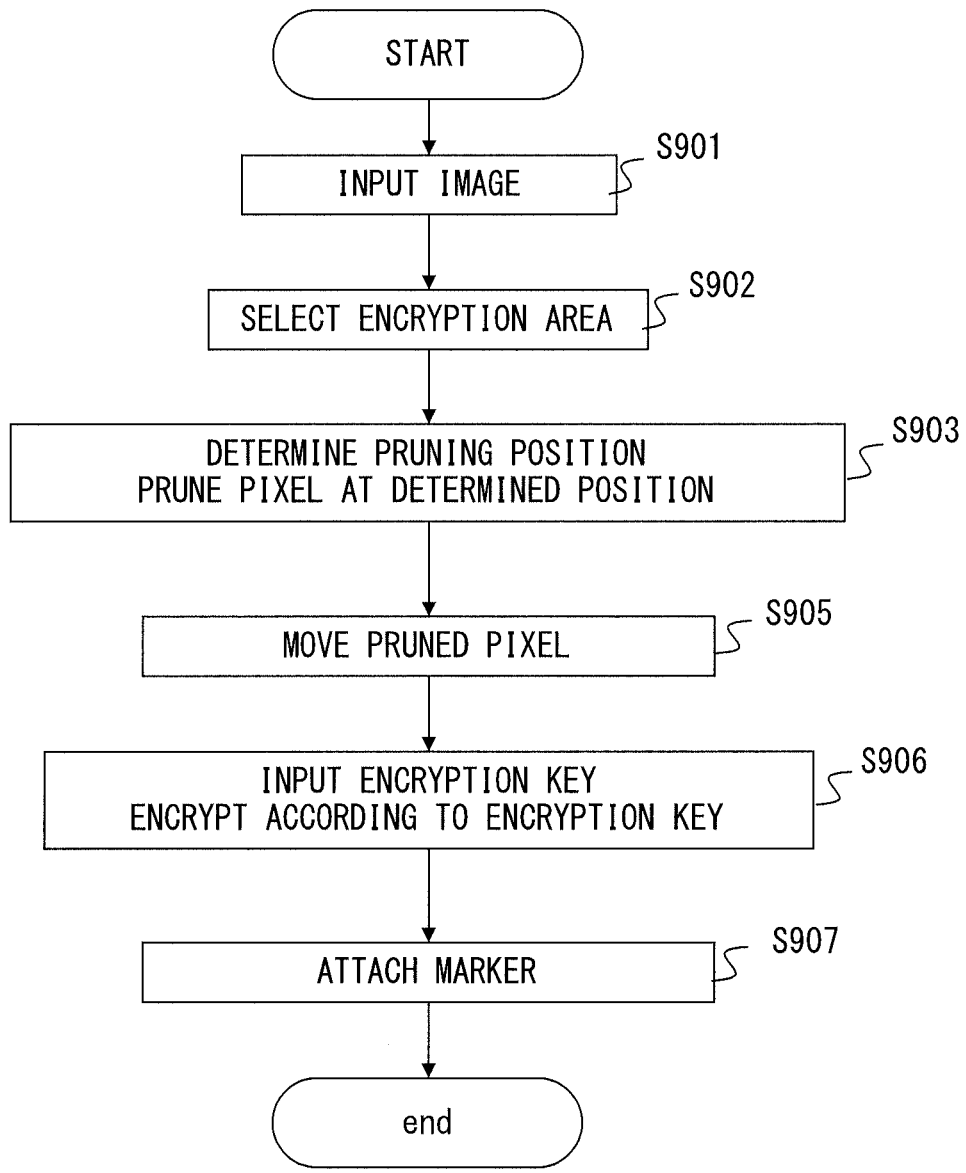
F I G. 1 8

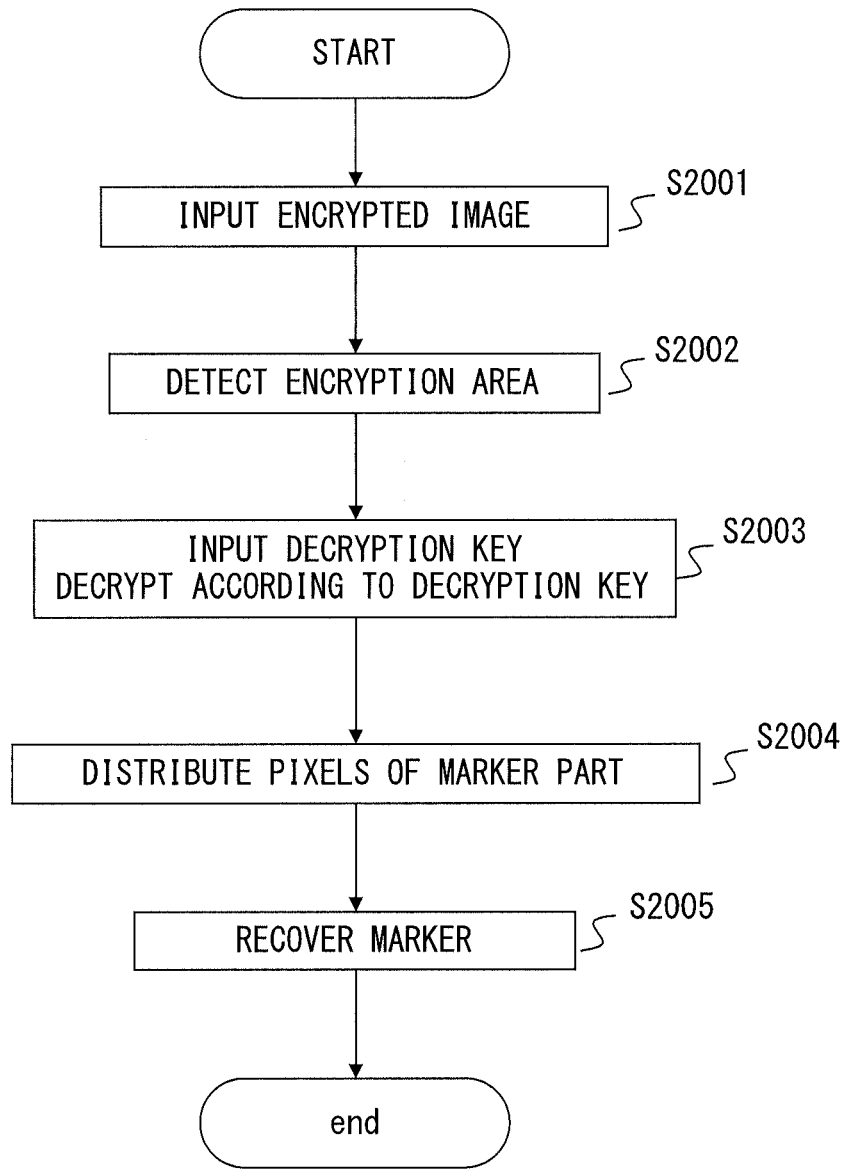
F I G. 2 0

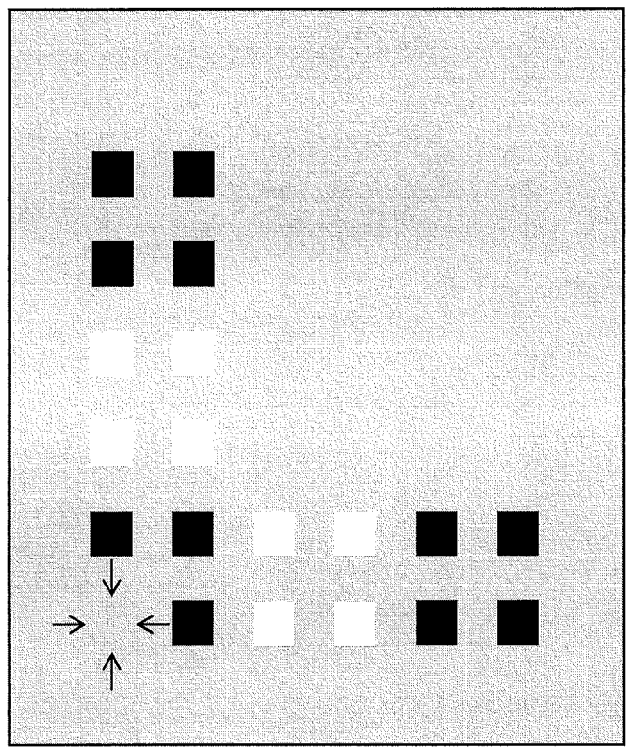
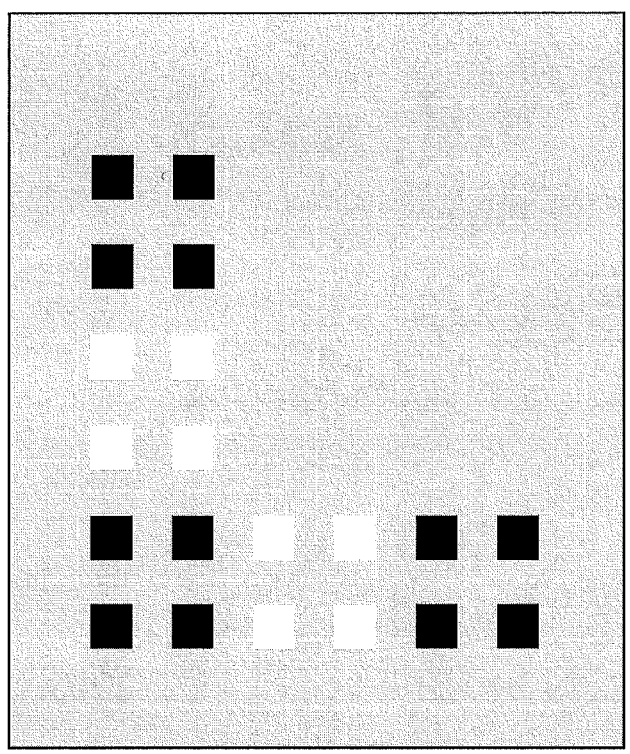
FIG. 27

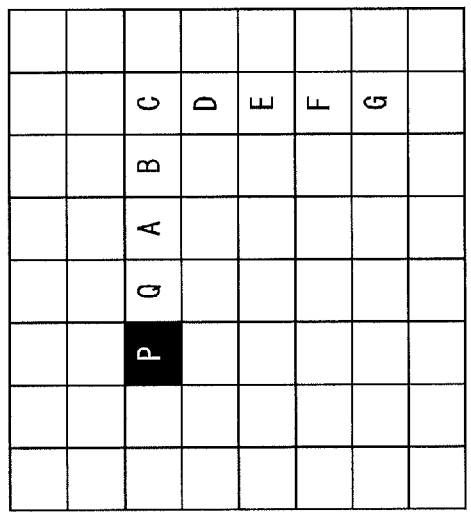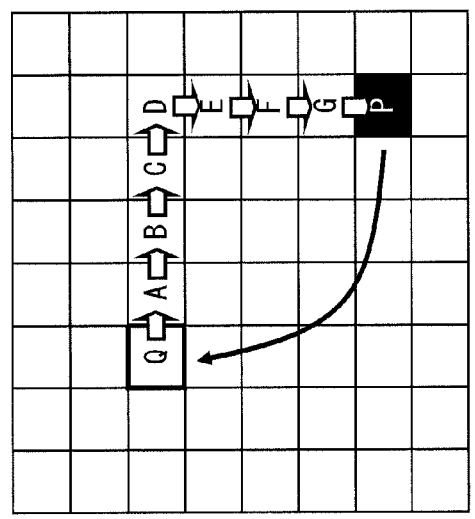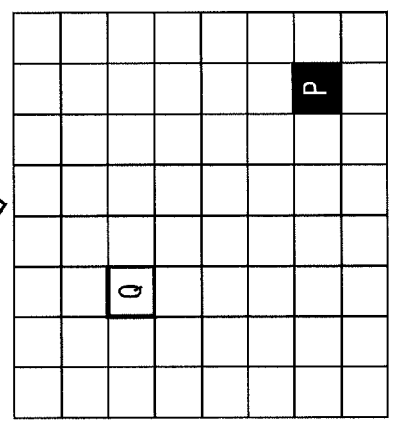
F I G. 32

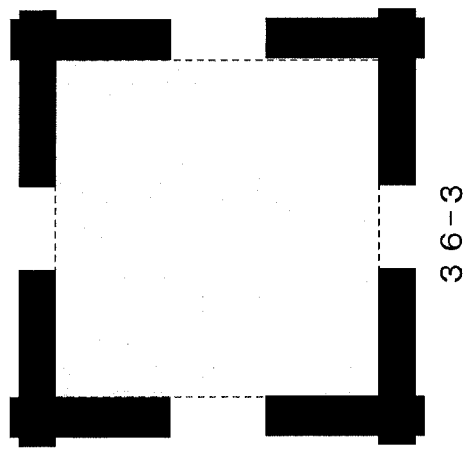
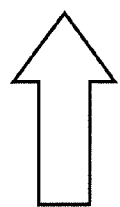
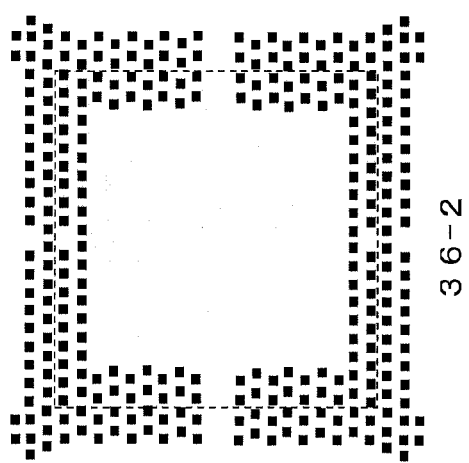
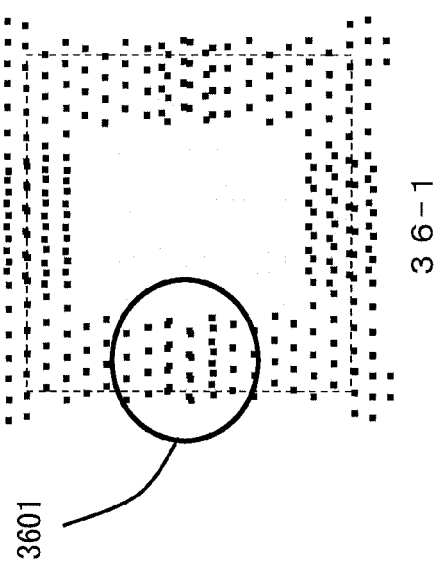
FIG. 36

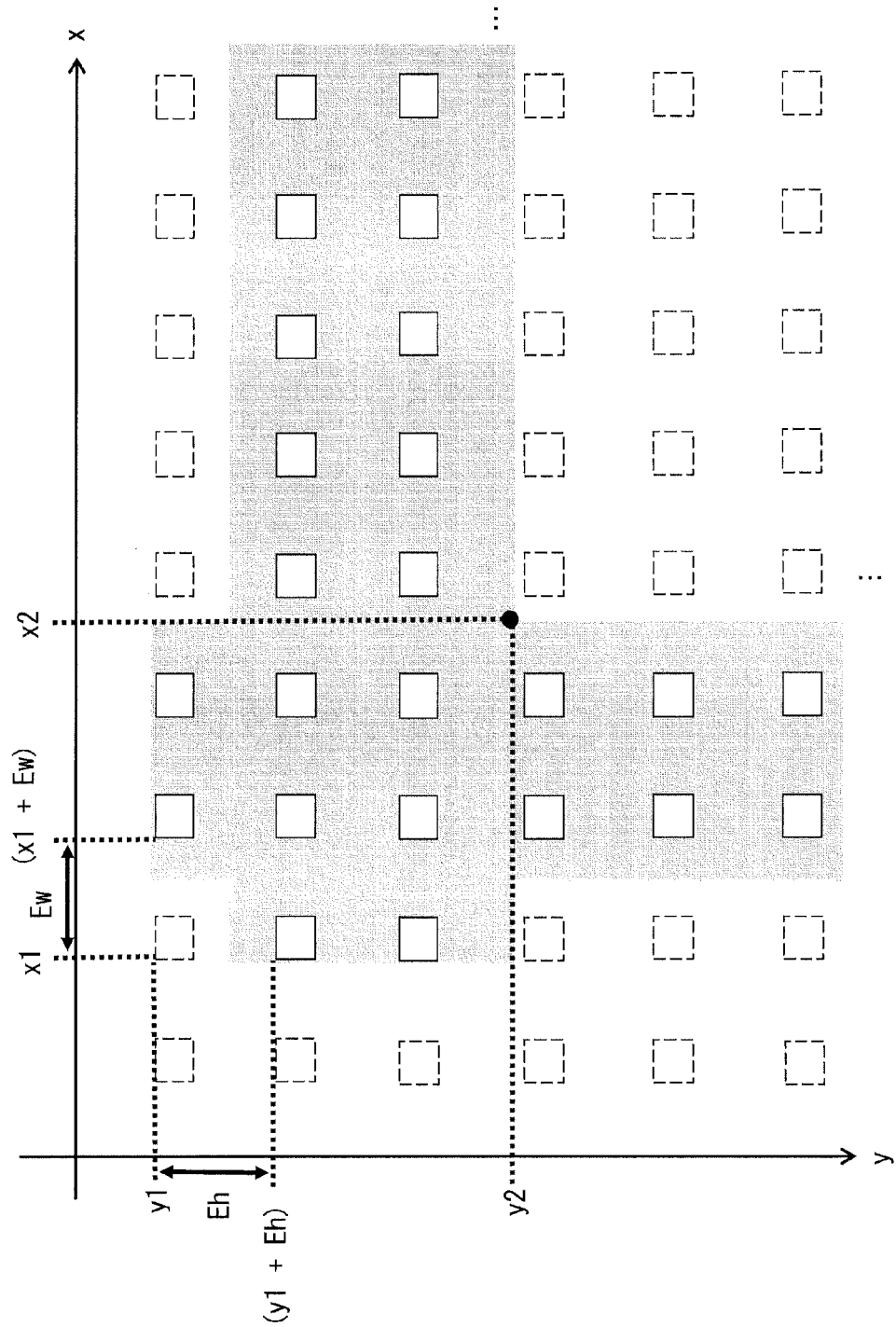
F I G. 4 1

IMAGE ENCRYPTION/DECRYPTION DEVICE, METHOD, AND STORAGE MEDIUM STORING A PROGRAM

CROSS-REFERENCE TO RELATED APPLICATION

This application is a continuation application of International PCT Application No. PCT/JP2009/002054 which was filed on May 11, 2009, the contents of which are hereby incorporated by reference.

TECHNICAL FIELD

The embodiments described below relate to a technique in an image printed on a printed matter and in an digital image to encrypt or encode a part of the image to avoid information leakage to a third party.

BACKGROUND ART

As the informatization of the society advances, information leakage has become a serious issue, and there has been a need for development of techniques for preventing information leakage. For example, for digital data distributed on the Web, Internet and electronic storage media, techniques for encrypting data has been developed so that even if information is caught by a third party, its contents are not to be seen, and has already been put to use as a useful means for preventing information leakage.

Meanwhile, techniques for preventing information leakage from printed matters printed on paper media and the like have not been developed sufficiently. In fact, it has been said that about half of information leakage is from printed matters, and there have been an urgent need for developing techniques for preventing information leakage from printed matters as well as for digital data.

Specific examples of needs for measures for preventing information leakage for printed matters include bills for purchased items, statements for credit cards and the like, medical records, school records, name lists, and the like, and prevention of information leakage by encrypting their important sections is required.

Against this background, a technique for encrypting or encoding printed matters and images has been developed as one of security measures for paper media. In this technique, pixel values of an area specified on a printed matter or an image are regularly converted, and encryption or encoding of the printed matter or the image is performed by generating a particular pattern corresponding to the conversion of the pixel values. At this time, on the four corners of the encrypted or encoded area, markers indicating the positions are placed. A reader that performs decrypting or decoding of the printed matter or the image for which encryption or encoding has been done as described above is able to perform decryption or decoding processing by detecting the markers placed on the area for which the encryption or encoding has been performed so that the coordinate of the area can be found and decryption or decoding processing can be performed.

In such a technique, when markers are placed on a printed matter or an image at the time of encryption or encoding, the original pixel values of the area on which the makers are placed may be overwritten by the markers. For this reason, at the time of decryption or decoding, the original pixel values of the area that were overwritten by the markers need to be recovered in one way or another. Otherwise, in the decrypted or decoded printed matter and image, the pixel values of the position would be missing, reducing the quality.

Here, a printed matter or an image for which encryption or encoding has been performed using the technique described above is supposed to be distributed not only through electronic media but also through paper media, and is subject to various quality deterioration. For this reason, recovery of the area that has been overwritten by the markers needs to be performed assuming quality deterioration of the printed matter and image. Furthermore, the recovery performance of the area that has been overwritten by the markers is also dependent on the image characteristics of the area that is overwritten (whether it is a background area or an area in which important information exists, etc).

However, conventionally, there has been no effective known recovery technique of a marker area in consideration of quality deterioration and image characteristics of a printed matter or an image.

Patent Document 1: Japanese Patent Application No. 2007-143301

SUMMARY

The first embodiment being an example of embodiments is executed as an encryption apparatus to encrypt document data, and is configured to include an input unit configured to input the document data; an area selection unit configured to select an area to encrypt in an input image obtained from the input document data; an image conversion unit configured to perform image conversion to the input image to generate a first encryption process image; an encryption processing unit configured to encrypt an encryption target area in the first encryption process image to generate a second encryption process image; and a marker attachment unit configured to attach a marker to the second encryption process image to generate and output a third encryption process image.

The second embodiment being an example of embodiments is executed as a decoding apparatus that decrypts encrypted data, and is configured to include an input unit configured to input the encrypted data; an area detection unit configured to detect an encryption area indicated by a marker; a decryption processing unit configured to decrypt the encryption area to generate a first encryption process image; an image reverse conversion unit configured to perform, to the first decryption process image, an image reverse conversion process to reverse image conversion performed at a time of encryption to generate a second decryption process image; and a pixel recovery unit configured to recover a pixel overwritten by the marker and to generate and output a third decryption process image.

In the first and second embodiments, at the time of marker attachment (at the time of encryption), for example, image conversion in which pixels to be overwritten by a marker are selected and pruned in a distributed manner and the pruning positions are moved to a marker attachment position is performed, and the marker is attached to the marker attachment position obtained as a result. Meanwhile, the time of marker elimination (at the time of decryption), for example, image reverse conversion in which each pixel of the marker is moved to the original position before the marker attachment is performed, each moved pixel of the marker is recovered, and the marker is eliminated. As a result, even in a case in which each pixel of the moved marker is interpolated from surrounding pixels, since the pixels to be overwritten by the markers are pruned in a distributed manner, it becomes possible to avoid a situation where image quality after the interpolation deteriorates by attachment of the markers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 is a diagram illustrating an example of a technique to evacuate the image to be overwritten by markers to a header.

FIG. 3 is a diagram illustrating an example of a technique to eliminate markers by interpolation from surrounding pixels.

FIG. 6 is a diagram illustrating an example of an image (before interpolation) whose image quality deteriorates after interpolation from attachment of markers.

FIG. 7 is a diagram illustrating an example of an image (after interpolation) whose image quality deteriorates after interpolation from attachment of markers.

FIG. 14 is a diagram illustrating an example (image data D8-5) of image data obtained by moving each pixel so that the pruned part is placed on the position to which the marker is attached, in an image conversion unit.

FIG. 15 is a diagram illustrating an example (image data D8-6) of image data obtained by an encryption process.

FIG. 17 is a configuration diagram of the second embodiment of the image encryption apparatus.

FIG. 18 is an operation flowchart illustrating the operation of the second embodiment of the image encryption apparatus.

FIG. 20 is an operation flowchart illustrating the operation of the first embodiment of the image decryption apparatus.

FIG. 27 is an illustration diagram of an image interpolation process in an approximate pixel recovery unit.

FIG. 32 is a diagram illustrating the moving procedure of each pixel in the pixel conversion unit.

FIG. 36 is a diagram illustrating an example in which the pruning positions in the pixel pruning unit are arranged densely when the encryption area is small.

FIG. 41 is a diagram illustrating a method to determine the positions of pixels that are not pruned in the marker attachment area in step S3907 in FIG. 39.

DESCRIPTION OF EMBODIMENTS

Figure 2:
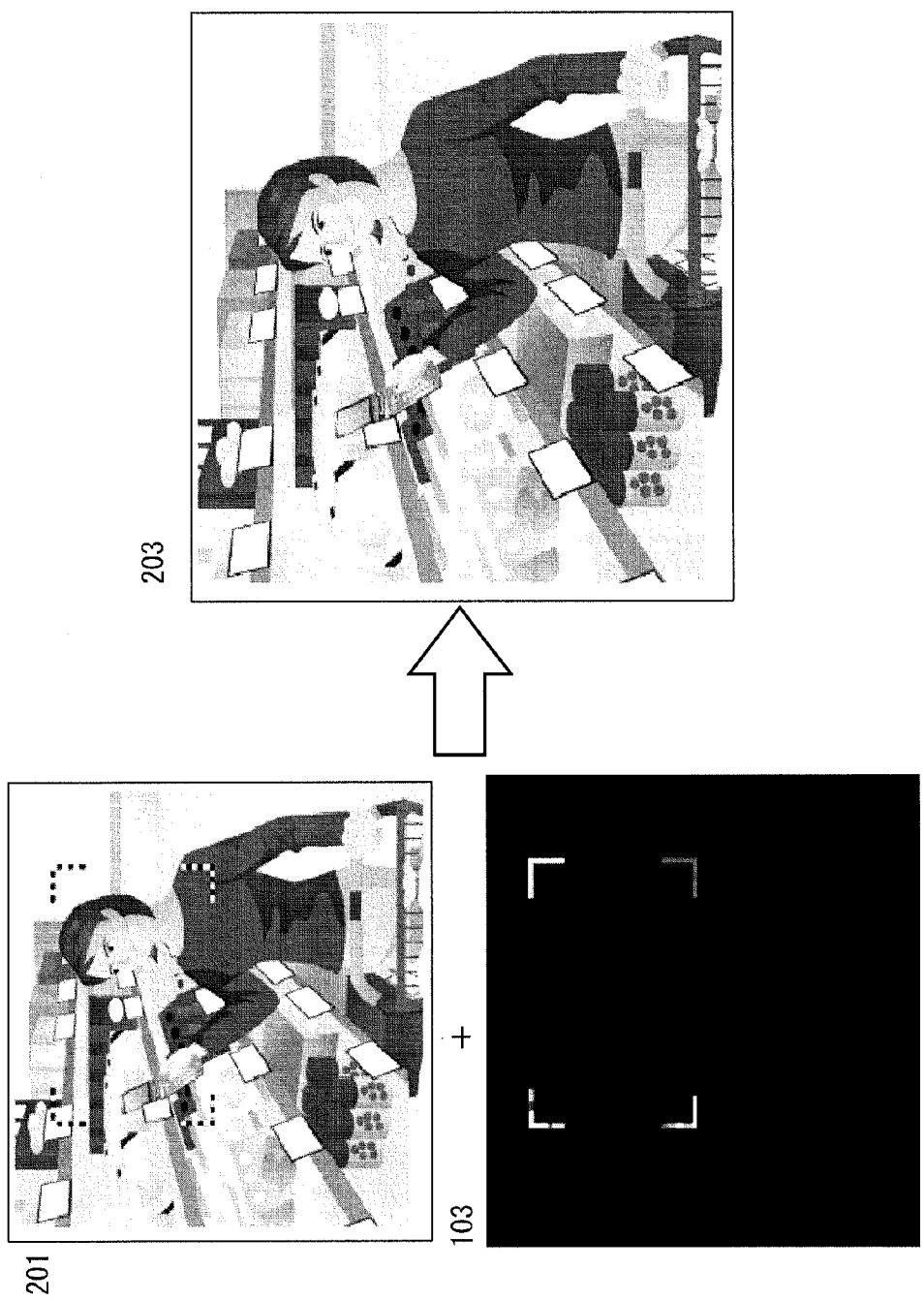
FIG. 2 is a diagram illustrating an example of a technique to eliminate markers by pixels evacuated to the header part.

Hereinafter, each embodiment is described in detail with reference to drawings.

Respective embodiments described below is assumed as an encryption apparatus that performs encryption or encoding and a decryption apparatus that performs decryption or decoding, as below, for a printed matter or an image. At this time, the encryption apparatus places, on the four corners of an area to be encrypted or encoded, markers to indicate the positions. The decryption apparatus that performs decryption or decoding of a printed matter of an image for which encryption or encoding has been performed as described above finds the coordinates of the area by detecting the markers placed in the area in which the encryption or encoding has been performed, and performs a decryption or decoding process. Then, the decryption apparatus recovers the original pixels of the area overwritten by the marker.

Here, the following methods may be assumed as the recovery technique of the marker area.

First Method: The original pixel values of the area to be overwritten by the marker at the time of encryption or encoding are evacuated to the header part and the like of the image file, and the original pixel values are returned to the original area from the header part and the like after eliminating the marker at the time of decryption or decoding, to recover the overwritten area.

Second Method: The pixel values of the overwritten area are recovered by interpolation from pixel values of its surrounding areas at the time of decryption or decoding.

In this case, in a case for example in which only a paper medium is to be distributed, the first method is not applicable. Practically, many cases involve mixed distribution of a paper medium and an electronic medium. For this reason, as the recovery technique of the marker area by decryption of decoding of a distributed printed matter or image, there is a need to use a technique in which both the first method and the second method are used. That is, in the decryption apparatus, when the header part and the like can be obtained, the area overwritten by the marker is recovered by the first method, and when the header part and the like cannot be obtained, the area overwritten by the marker is recovered by the second method.

In the description below, first, the basic technique in which both the first method and the second method are used is explained, and challenges in implementing the basic technique are explained next, and based on that, each embodiment to solve the challenge is explained.

FIG. 1 is a diagram illustrating an example of a technique to evacuate an image to be overwritten by a marker to a header. An image 101 in FIG. 1 is an image encrypted by the encryption procedure disclosed in Japanese Patent Application No. 2008-076129, a prior patent application by the applicant. As illustrated in FIG. 1, a marker 102 for area detection is attached to the four corners of the encrypted area, An image 103 overwritten by the marker 102 is evacuated in advance to the header part of file data of the image 101 before the marker is attached.

FIG. 2 is a diagram illustrating an example of a technique to eliminate the marker by pixels evacuated to the header part. A the time of the decryption, the markers placed on the four corners of the encryption area are searched first, to identify the position of the encryption area. After that, a decryption process is performed for the identified area, and a decrypted image as illustrated in 201 in FIG. 2 is obtained. At that time, when the image 103 of the marker part exists in the header part, the pixels 103 in the header part are replaced with the marker part, and a decrypted image 203 is obtained.

FIG. 3 is a diagram illustrating an example of a technique to eliminate the marker by interpolation from surrounding pixels. When no image information exists in the header part, the original image of the marker part is interpolated from surrounding pixels and recovered approximately to eliminate the marker, and a decrypted image 302 is obtained.

In case in which a thick marker is set in order to increase the detection accuracy of the encrypted area, a technique as described below may be adopted.

Figure 4:
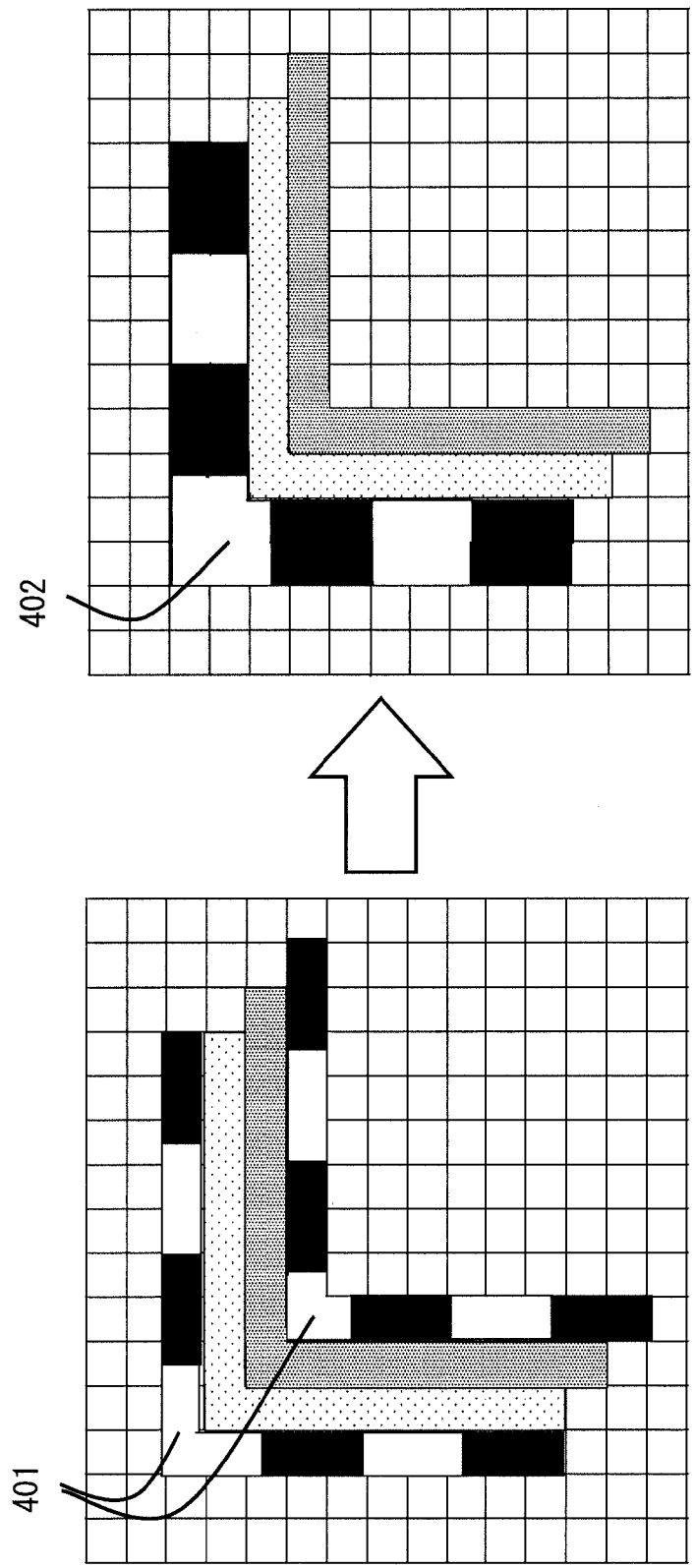
FIG. 4 is a diagram illustrating an example of a technique to generate a thick marker by integrating two thin markers.

FIG. 4 is a diagram illustrating an example of a technique to generate one thick marker by combining two thin markers. When a thick marker is placed in the encryption apparatus, first, two divided thin markers as in 401 in FIG. 4 are placed on the target position in the image. After that, one of the markers is moved by pixel exchange, to combine it with the other of the markers. As a result, one thick marker as illustrated as 402 is generated.

Figure 5:
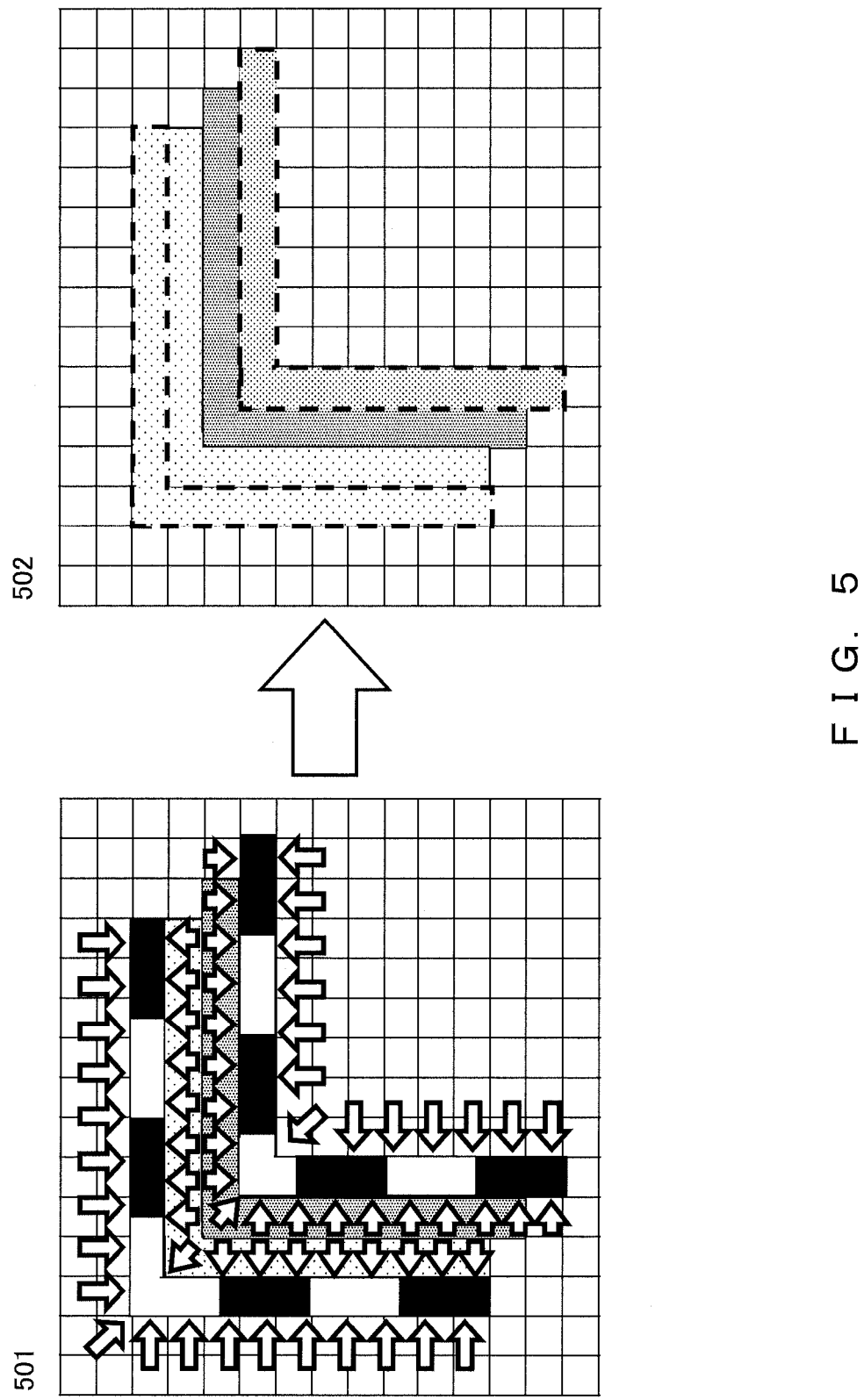
FIG. 5 is a diagram illustrating an example of a technique to eliminate markers by interpolation from surrounding pixels after dividing a thick marker into two.

FIG. 5 is a diagram illustrating an example of a technique to eliminate the marker by interpolation from surrounding pixels after dividing a thick marker into two. The elimination of the marker in the decrypting apparatus is an inverse procedure of the generation of the marker. First, after the marker is divided into two, each pixel in the divided marker area is interpolated from surrounding pixels as in 501 in FIG. 5, and a decrypted image 502 is obtained.

When a larger marker needs to be generated, the marker may be divided into three or more. They make it possible to generate a large marker with which image quality of the background image is not degradated as much as possible and the encryption area is detected easily.

Figure 7:
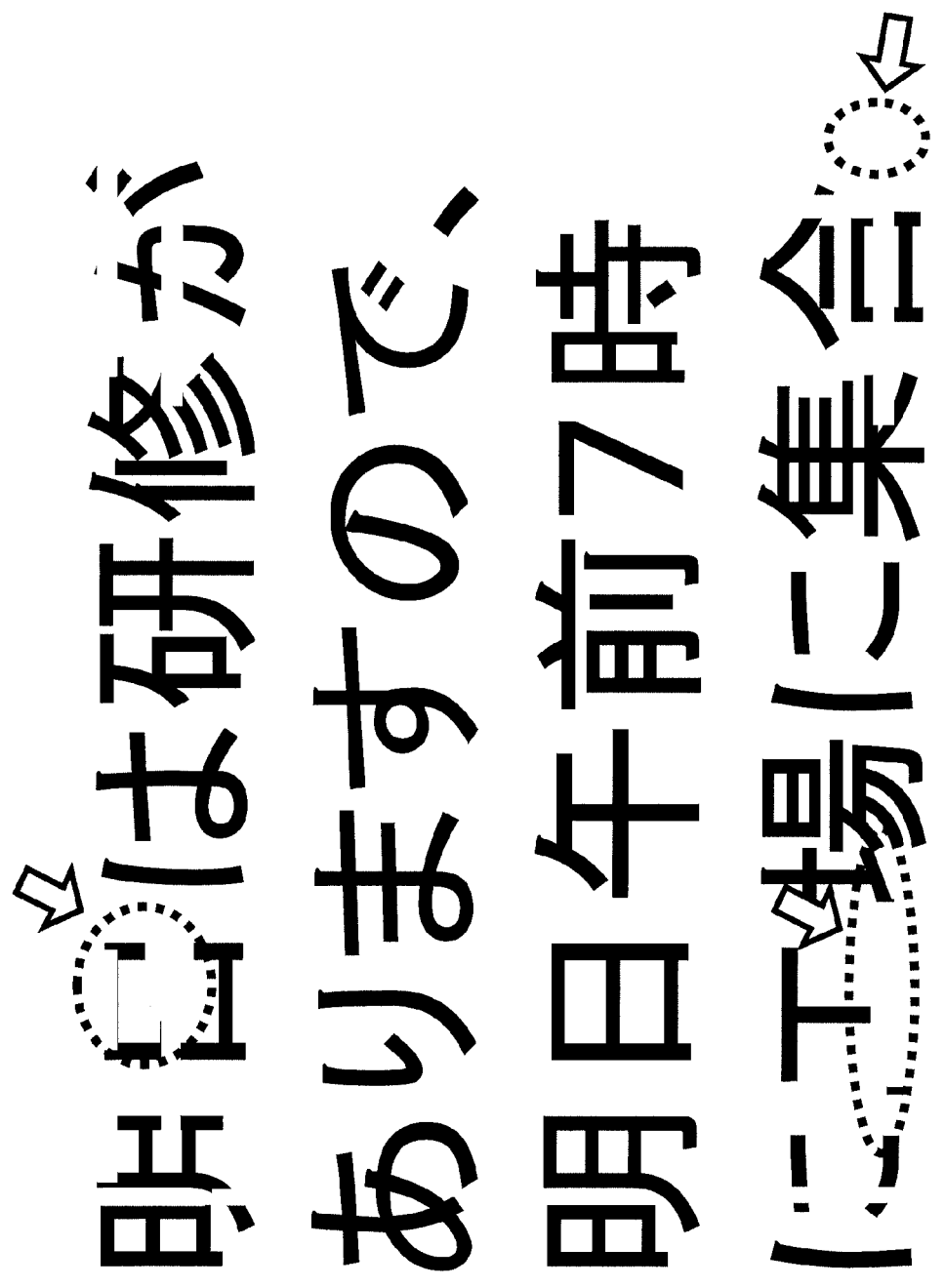

However, when a plurality of markers are generated and combined, important information may be lost when the marker is created. FIG. 6 and FIG. 7 are diagrams illustrating an example of an image whose image quality deteriorates after interpolation in attachment of the marker (FIG. 6 is before interpolation and FIG. 7 is after interpolation). For example, as illustrated as arrow parts in FIG. 6, if a marker on a line is written over a fine line of characters and the like, even if the area of the marker area is recovered approximately by interpolation, as illustrated in arrow parts in FIG. 7, the original image cannot be recovered.

Therefore, as each embodiment described below solves the issue of quality degradation caused by elimination of a marker by interpolation in the following procedure.

At the time of marker attachment (at the time of encryption)

(a) Pixels to be overwritten by the marker are selected and pruned, and the pruning positions are moved to the marker attachment position (at the same time, pixels that are not to be overwritten are also moved to the positions that are not overwritten by the marker).

(b) The marker is attached to the marker attachment position.

At the time of marker elimination (at the time of decryption)

(c) Pixels of the marker are moved to the original position (at this time, the pixels of other than the marker are also moved to the original positions before the marker attachment at the same time).

(d) The moved pixels of the marker are interpolated from surrounding pixels and recovered, and the marker is eliminated.

In the procedure above, overwriting target pixels are selected and pruned in a distributed manner regarding the process (a). In addition, the movement method is elaborated so that the positional relationship of pixels that are not pruned does not become discontinuous after moving the pixels. By these techniques, as illustrated in FIG. 6 and FIG. 7, the issue of image quality deterioration in which fine lines of characters and the like disappears due to pixel interpolation.

Figure 8:
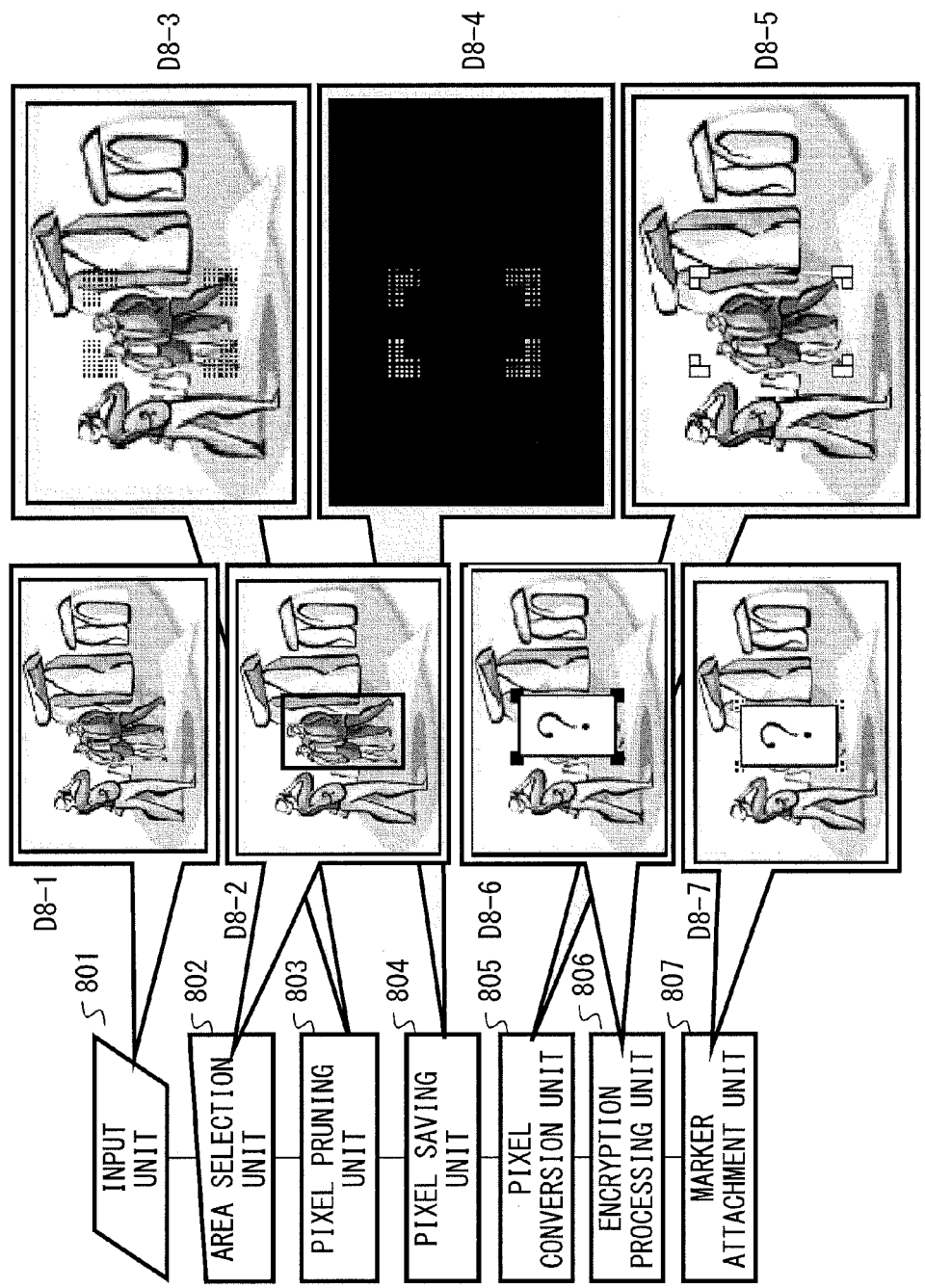
FIG. 8 is a configuration diagram of the first embodiment of an image encryption apparatus.
Figure 9:
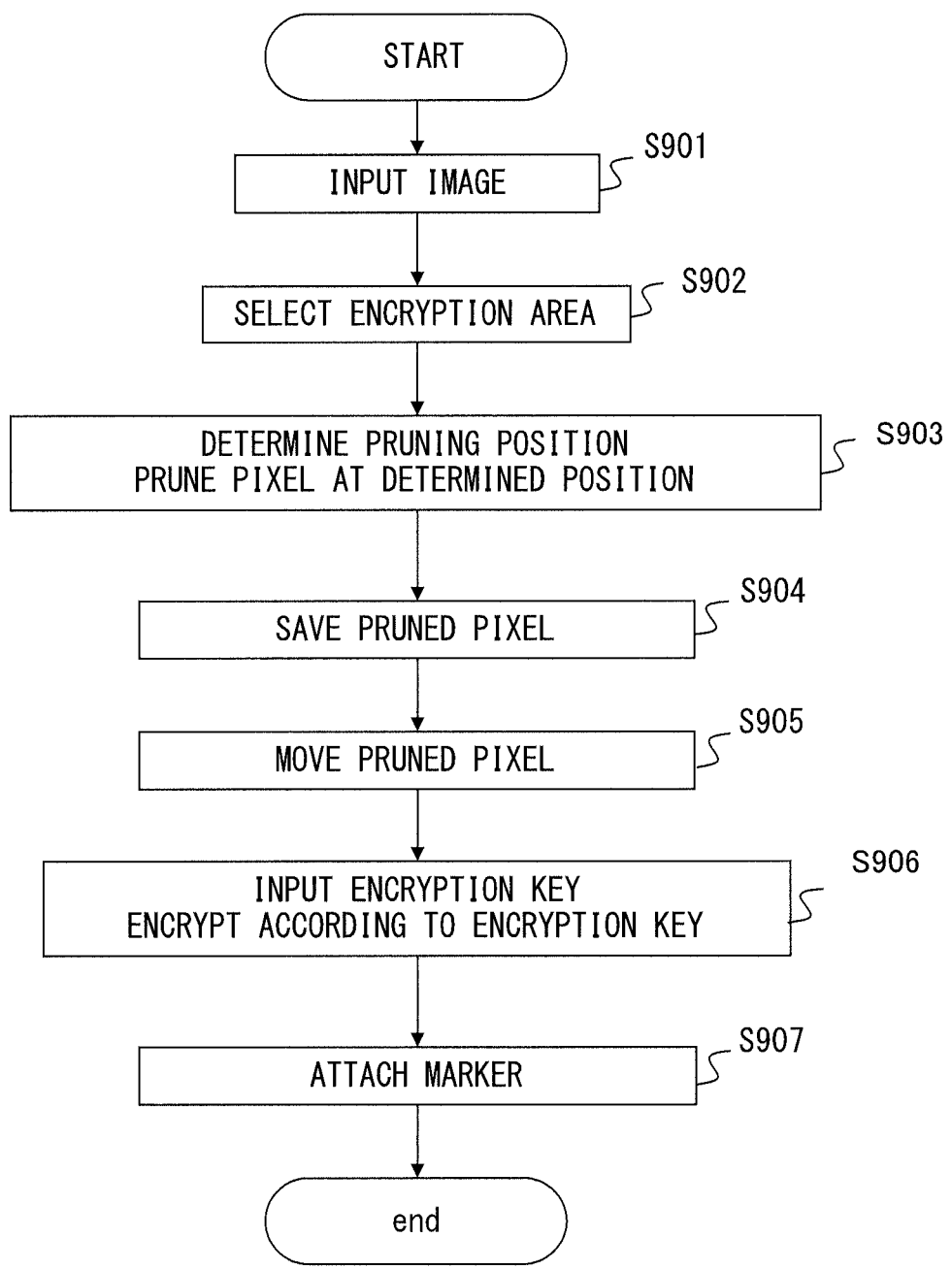
FIG. 9 is an operation flowchart illustrating the operation of the first embodiment of the image encryption apparatus.
Figure 44:
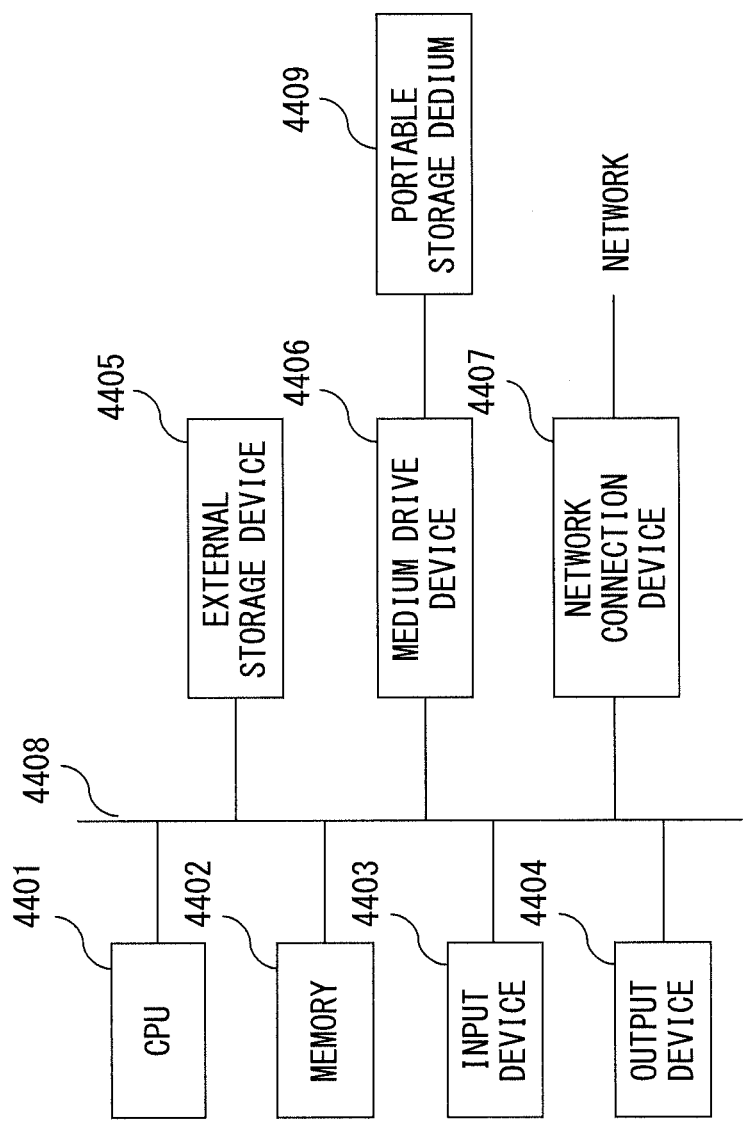
FIG. 44 is a hardware configuration diagram of a computer system to realize the system of each embodiment.

FIG. 8 is a configuration diagram of the first embodiment of an image encryption apparatus that makes it possible to decrypt an image overwritten by a marker when the marker is eliminated at the time of decryption. Meanwhile, FIG. 9 is an operation flowchart illustrating the operation of the first embodiment of the image encryption apparatus. As illustrated in FIG. 8, the first embodiment of the image encryption apparatus is realized by an input unit 801, an area selection unit 802, a pixel pruning unit 803, a pixel saving unit 804, a pixel conversion unit 805, an encryption processing unit 806, and a marker attachment unit 807. Each of these processing units is realized for example with a computer apparatus having a configuration as illustrated in FIG. 44 described later for example executing a program that realizes the control operation illustrated in the flowchart in FIG. 9.

Figure 10:
FIG. 10 is a diagram illustrating an example (image data D8-1) of an input image data (encryption target image).

In the configuration in FIG. 8, the input unit 801 takes in input data as image data (step S901 in FIG. 9). Image data to be taken in may be an electronic document in the HTML (Hyper Text Markup Language) format or in a file format by various word processors converted into an image. Alternatively, it may be data in which only a part is converted into an image. In addition, the image data may be image data obtained by scanning a printed matter by a scanner apparatus or an apparatus such as an MFP (Multi Function Printer), an image data captured by a digital camera and the like, etc. In FIG. 8, as an example, a case in which image data D8-1 is input is illustrated. FIG. 10 is an enlarged view of the image example D8-1.

Figure 11:
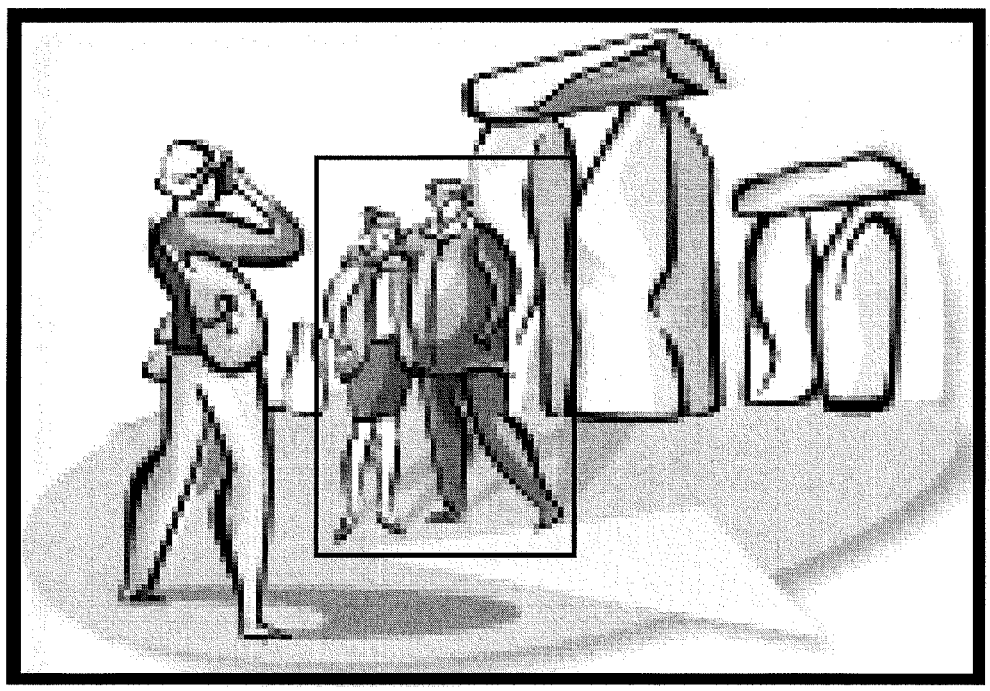
FIG. 11 is a diagram illustrating an example of image data (image data D8-2) in which an area to be encrypted is selected from an input image.

Next, the area selection unit 802 selects an area to be encrypted from within the input imaged data (for example D8-1) as in an image example D8-2 in FIG. 8 (step S902 in FIG. 9), FIG. 11 is an enlarged view of the image example D8-2. The selection operation is performed for example in accordance with the operation of the user giving instruction using a pointing device such as a mouse on the display screen on a display apparatus and the like.

Figure 12:
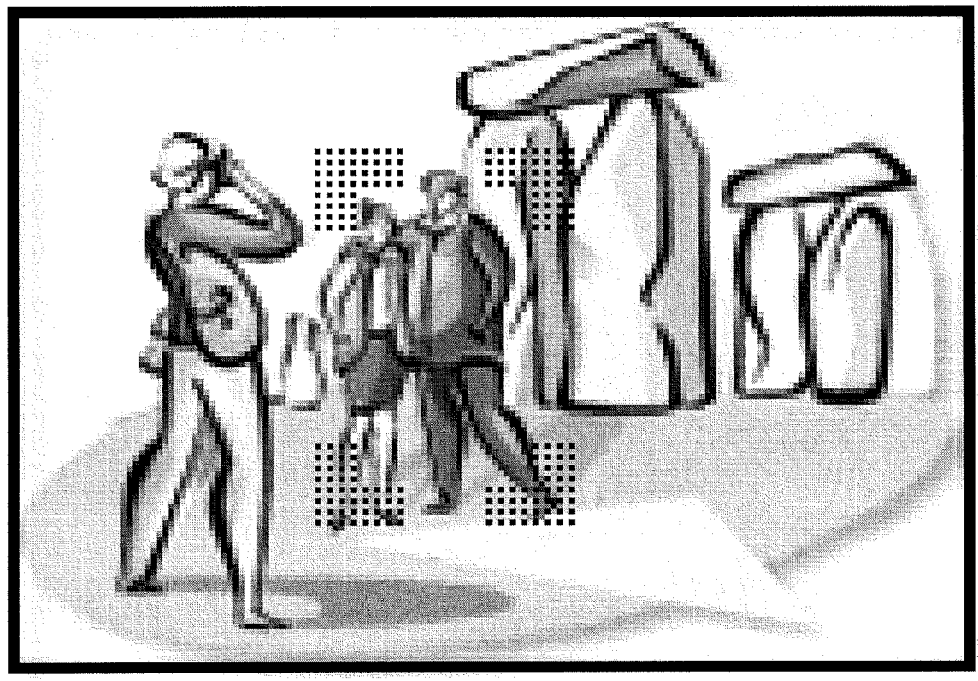
FIG. 12 is a diagram illustrating an example (image data D8-3) of image data in which pixels to be overwritten by markers are pruned by pixel pruning unit.

Next, the pixel pruning unit 803 in FIG. 8 determines the positions of pixels to be overwritten by a marker later in the marker attachment unit 807 (pruning positions), and prunes the pixels in the pruning positions as in the black part in an image example D8-3 in FIG. 8 (step S903 in FIG. 9). FIG. 12 is an enlarged view of the image example D8-3. The pixels to be the target of the overwriting are selected from the position to which a marker is attached later and its surrounding pixels. The surrounding pixels may be pixels in the encryption area, or may be pixels outside the encryption area. A detail method to determine pruned pixels in the pixel pruning unit 803 is described later.

Figure 13:
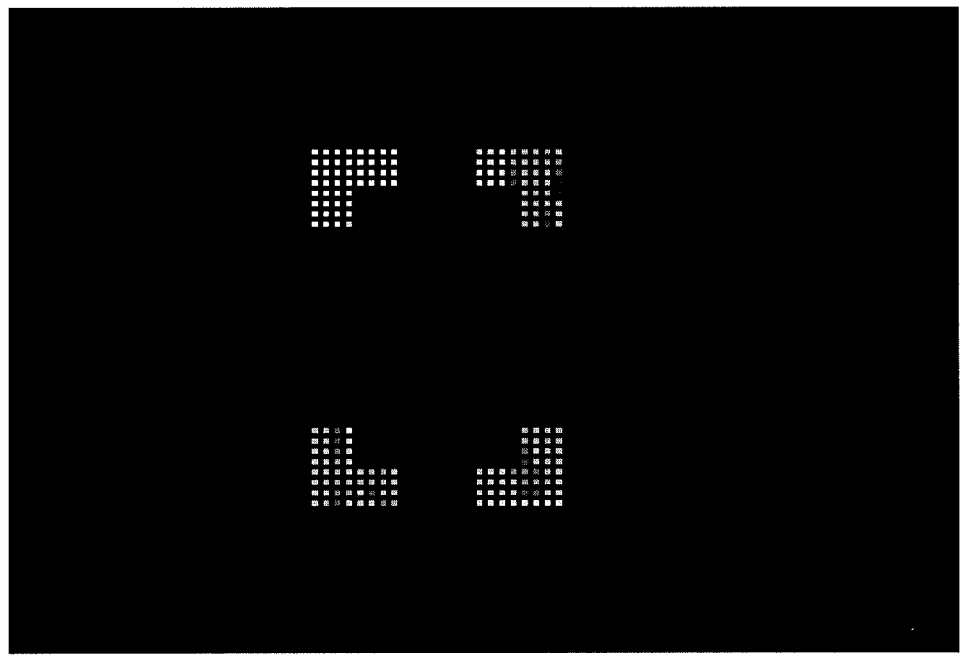
FIG. 13 is a diagram illustrating an example (image data D8-4) of pixel information saved in a header part and the like of image data in a pixel saving unit.

Next, the image saving unit 804 in FIG. 8 evacuates image information obtained after pruning is performed as in the image example D8-3, for example D8-4 in FIG. 8 to the main body part or the header part of the image data file (step S904 in FIG. 9). FIG. 13 is an enlarged view of the image information example D8-4.

Next, the pixel conversion unit 805 in FIG. 8 moves each pixel of the image in which some parts are pruned as in D8-3 by a pixel shifting operation described later by the pixel pruning unit (step S905 in FIG. 9). As a result, as illustrated in an image example D8-5 in FIG. 8, the pruning positions are placed in positions to which a marker is attached by the marker attachment unit 807 described later. FIG. 14 is an enlarged view of an image example D8-5. Since not only the pixels at the pruning positions but also pixel positions around the pruning positions are moved, the image that has been subjected to the process by the pixel conversion unit 805 is an image in which some parts are transformed as illustrated in FIG. 14. Details of the operation of the pixel conversion unit 805 are described later.

Next, the encryption processing unit 806 in FIG. 8 encrypts the area selected by the area selection unit 802 in with respect to the image data in the image example D8-5, and outputs image data as illustrated in an image example D8-6 in FIG. 8 (step S906 in FIG. 9). FIG. 15 is an enlarged view of the image example D8-6. Here, as an encryption process, the encryption technique disclosed in Japanese Patent Application No. 2008-076129, a prior patent application by the applicant mentioned above. Alternatively, an existing encryption method based on a common encryption key or a public key such as the AES (Advanced Encryption Standard) and DES (Data Encryption Standard).

Figure 16:
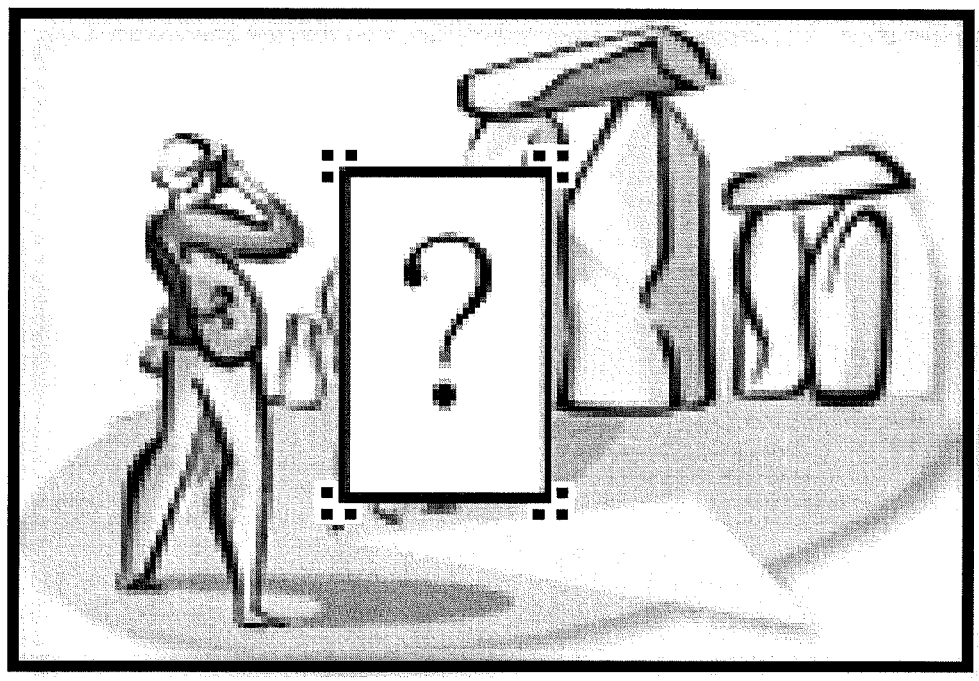
FIG. 16 is a diagram illustrating an example (image data D8-7) of image data obtained by attaching markers to pruning positions.

Lastly, the marker attachment unit 807 in FIG. 8 attaches marker to the pruning area indicated in black in the encryption image like the image example D8-6 as illustrated in an image example D8-7 (step S907 in FIG. 9). FIG. 16 is an enlarged view of the image example D8-7. The shape, pattern, size may be any shape, pattern and size without being limited to the ones as in the image example D8-7.

The encrypted image such as the image example D8-7 that is encrypted with attachment of a marker is attached to the input document data, and is presented on the display, saved electronically in a file, or printed on paper.

The order of the processes by a series of processing units from the pixel pruning unit 803 to the marker attachment unit 807 may be changed. For example, the orders of the image conversion unit 805 and the pixel saving unit 804 may be reversed. In addition, the process by the encryption processing unit 806 may be performed before the process by the pixel pruning unit 803 (after the process by the area selection unit 802), or may be performed after the process by the marker attachment unit 807. When the process by the encryption processing unit 806 is performed before the process by the pixel pruning unit 803, the process by the decoding processing unit (such as 1903 in FIG. 19) of the embodiment of the image decoding apparatus described later is performed after the process by a pixel recovery unit (such as 1905 in FIG. 19) or an approximate pixel recovery unit.

FIG. 17 is a configuration diagram of the second embodiment of the image encryption apparatus. Meanwhile, FIG. 18 is an operation flowchart of illustrating the operation of the second embodiment of the image encryption apparatus. In FIG. 17, the processing units or image examples to which the same numbers as in the first embodiment of the image encryption apparatus illustrated in FIG. 8 are assigned are the same as in FIG. 8. In addition, in FIG. 18, the processing steps to which the same numbers as in the operation flowchart in FIG. 9 are assigned are the same as in FIG. 9. The second embodiment of the image encryption apparatus illustrated in FIG. 17 and FIG. 18 differs from the first embodiment of the image encryption apparatus illustrated in FIG. 8 and FIG. 9 in that the saving process (step S904 in FIG. 9) of pruned pixels by the image saving unit 804 in FIG. 8 is not performed. That is, in the second embodiment of the image encryption apparatus, information of pruned pixels is not evacuated, and is not sent to the decoding apparatus side. Meanwhile, at the decoding apparatus side, as described later, the pruned pixels are recovered approximately from surrounding pixels.

A configuration in which, instead of processes by the pixel pruning unit 803 and the pixel conversion unit 805 illustrated in FIG. 8 or FIG. 17, a margin for attaching the marker is created by scaling down the image being the encryption target is also possible. Other than that, various image conversions may be performed before attaching the marker.

Figure 19:
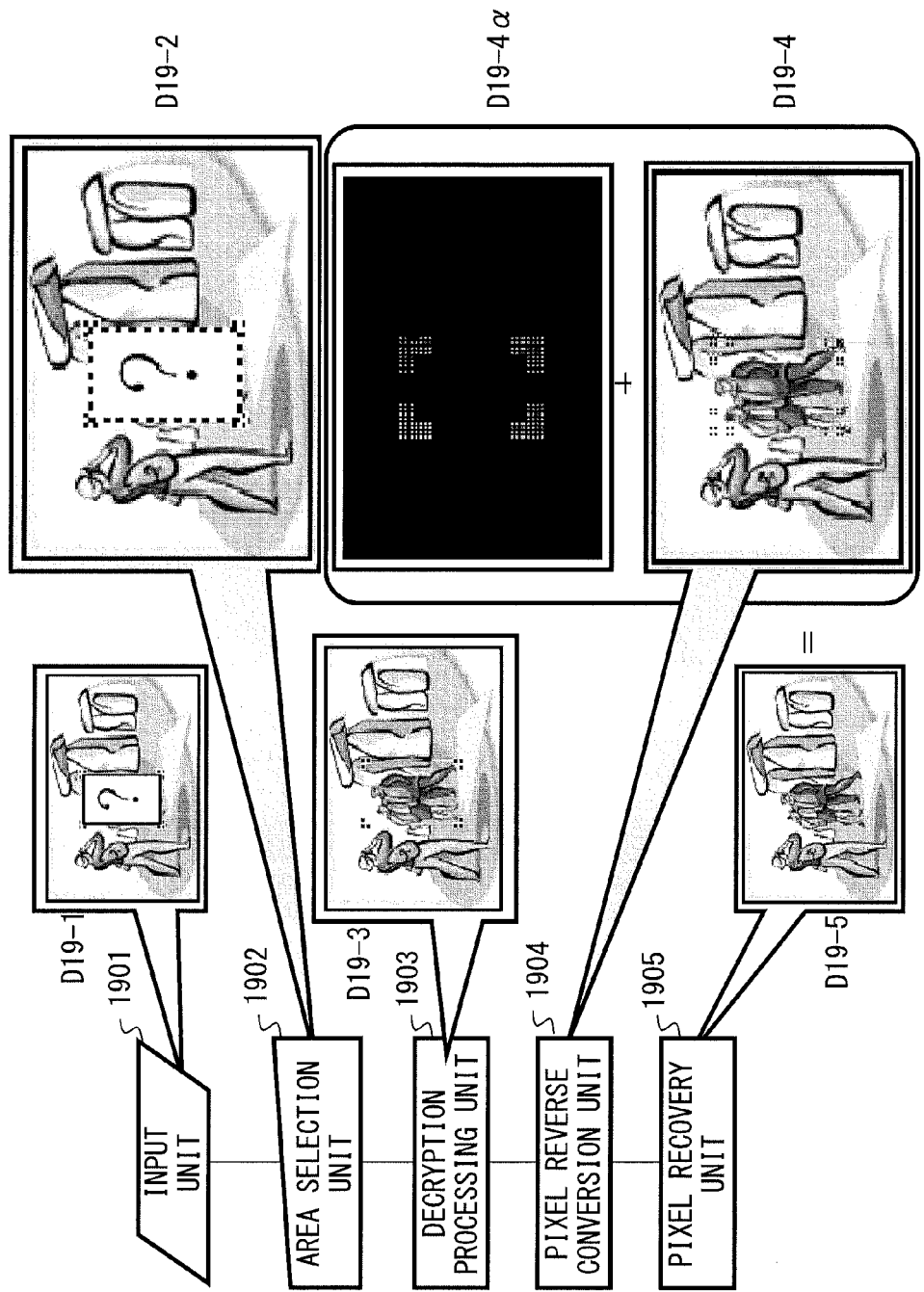
FIG. 19 is a configuration diagram of the first embodiment of an image decryption apparatus.

FIG. 19 is a configuration diagram of the first embodiment of an image decryption apparatus for decrypting the encrypted image (D8-7: FIG. 16) encrypted by the first embodiment of the image encryption apparatus illustrated in FIG. 8 and FIG. 9. Meanwhile, FIG. 20 is an operation flowchart illustrating an operation of the first embodiment of the image decryption apparatus. As illustrated in FIG. 19, the first embodiment of the image decryption apparatus is realized by an input unit 1901, an area detection unit 1902, a decryption unit 1903, a pixel reverse conversion unit 1904, and an image recovery unit 1905. Each of these processing units is realized for example with a computer apparatus having a configuration as illustrated in FIG. 44 described later for example executing a program that realizes the control operation illustrated in the flowchart in FIG. 20.

In the configuration in FIG. 19, the input unit 1901 inputs encrypted image data (step S2001 in FIG. 20). The image data may be an electronic document in the HTML (Hyper Text Markup Language) format or in a file format by various word processors converted into an image in the same manner in the first embodiment of the encryption apparatus in FIG. 8. Alternatively, it may be data in which only a part is converted into an image. In addition, the image data may be image data obtained by taking in an printed encrypted image again by a scanner, a digital camera and the like. In FIG. 19, as an example, a case in which image data D19-1 (corresponding to D8-7 in FIG. 8 or FIG. 16) is input is illustrated.

Figure 21:
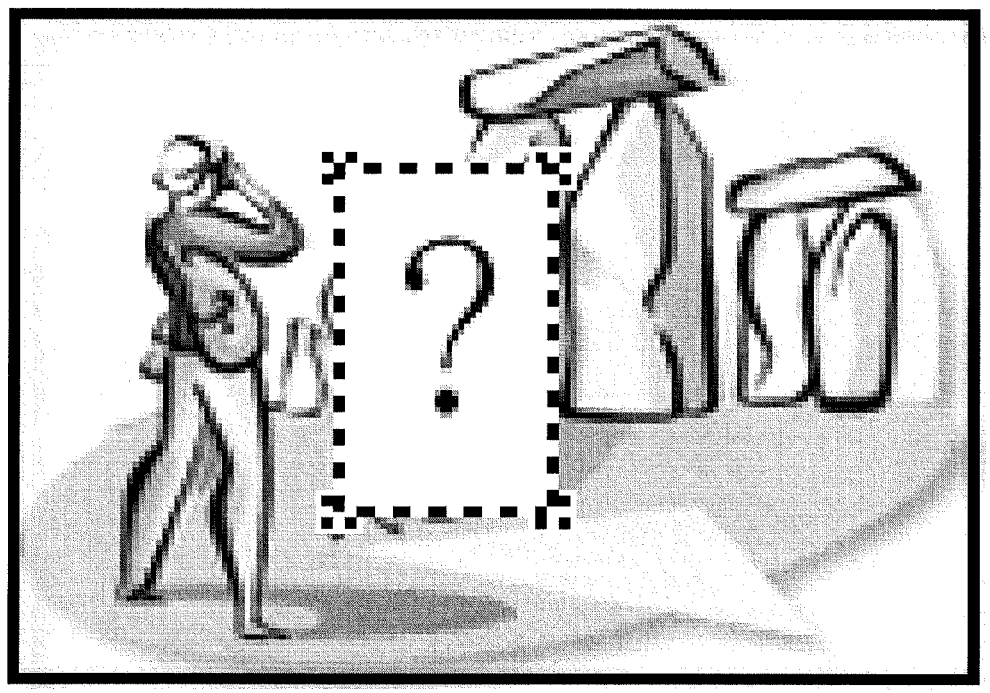
FIG. 21 is a diagram illustrating an example (image data D19-2) of image data in which an encryption area indicated by markers is detected.

Next, the area detection unit 1902 in FIG. 19 detects an area indicated by the markers as illustrated in an image example D19-2 in FIG. 19 from the input image data (for example D19-1) (step S2002 in FIG. 20). FIG. 21 is an enlarged view of the image example D19-2. As the method for marker search, methods disclosed in Patent Document 1 above by the present application and Japanese Patent Application No. 2008-076129, a prior patent application by the applicant mentioned above may be used, or other existing method may be used.

Figure 22:
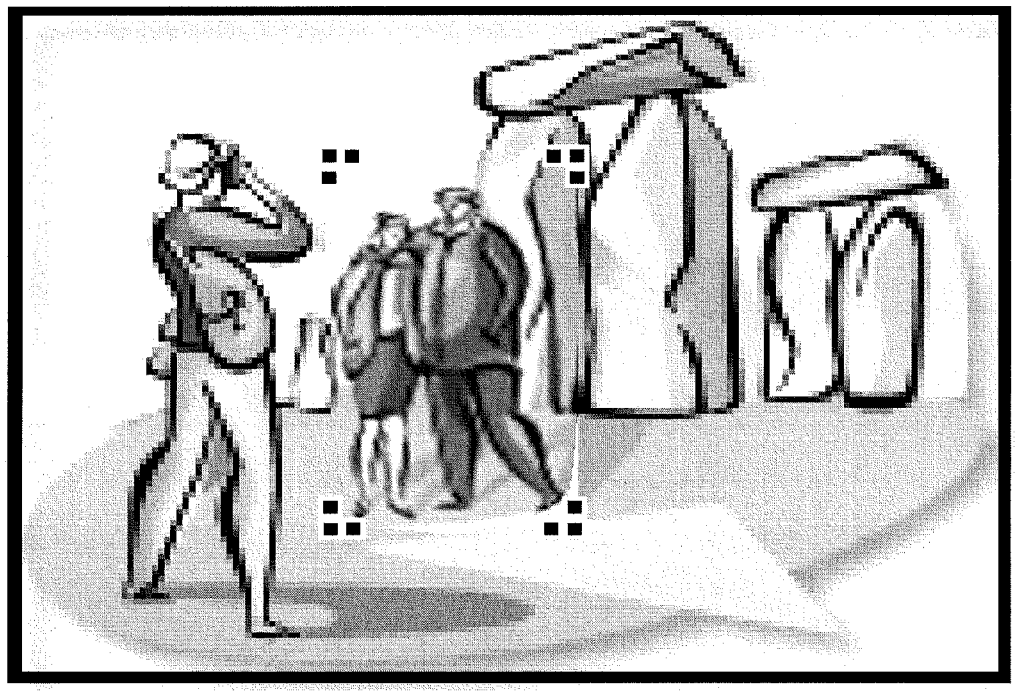
FIG. 22 is a diagram illustrating an example (image data D19-3) of image data obtained by recovering an encrypted image in an encryption area.

Next, the decryption processing unit 1903 in FIG. 19 decrypts image data in the state in which markers remain as illustrated in an image example D19-3 in FIG. 19, using a decryption key, from the image data in which the encryption area is identified, like the image example D19-2 (step S2003 in FIG. 20). FIG. 22 is an enlarge view of the image example D19-3.

Figure 23:
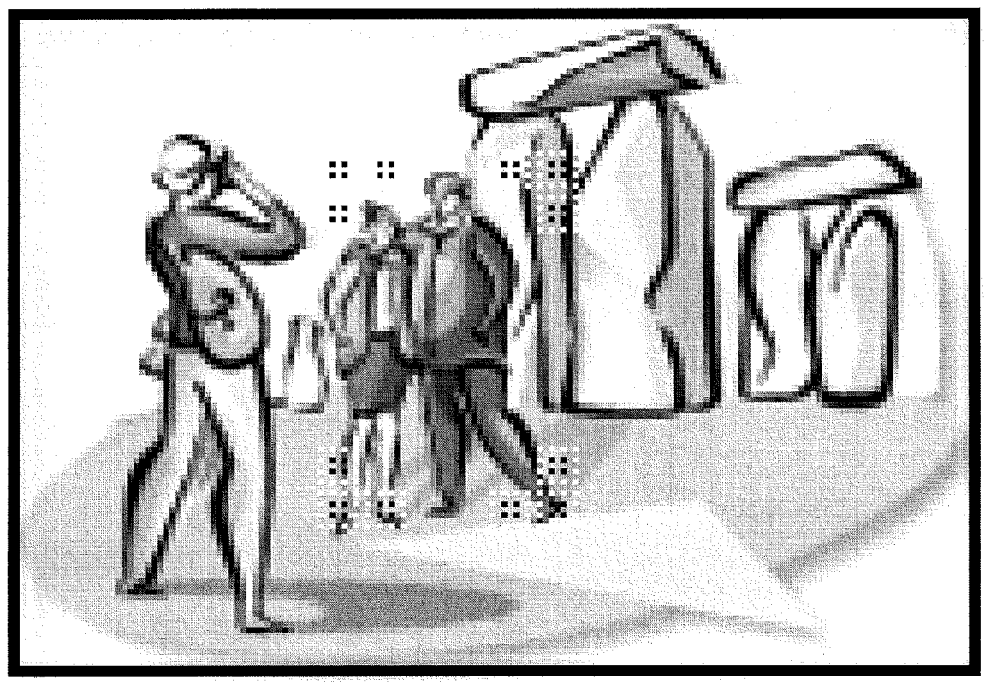
FIG. 23 is a diagram illustrating an example (image data D19-4) of image data obtained by distributing pixels to which markers were attached to the positions of the original pixels by the pixel reverse conversion unit.

Further, the pixel reverse conversion unit 1904 in FIG. 19 executes a reverse conversion process of the pixel conversion process by the pixel conversion unit 805 in FIG. 8, to recover the image of the remaining marker parts (step S2004 in FIG. 20). As a result, as illustrated in an image example D19-4 in FIG. 19, marker pixels are distributed. FIG. 23 is an enlarged view of the image example D19-4.

Figure 24:
FIG. 24 is a diagram illustrating an example (image data D19-5) of image data obtained by recovering pixels of overwritten markers by an image recovery unit.

When the marker pixels are distributed as in the original image, the image recovery unit 1905 in FIG. 19 recovers the image before encryption using image information such as an image information example D19-α in FIG. 19 that has been evacuated to the main body part or the header part of the image data file by the image saving unit 804 in FIG. 8 (step S2005 in FIG. 20). As a result, an image like an image example D19-5 in FIG. 19 is recovered. FIG. 24 is an enlarged view of the image example D19-5.

The image decrypted as described above is presented on the display, saved electronically in a file, or printed on paper.

Figure 25:
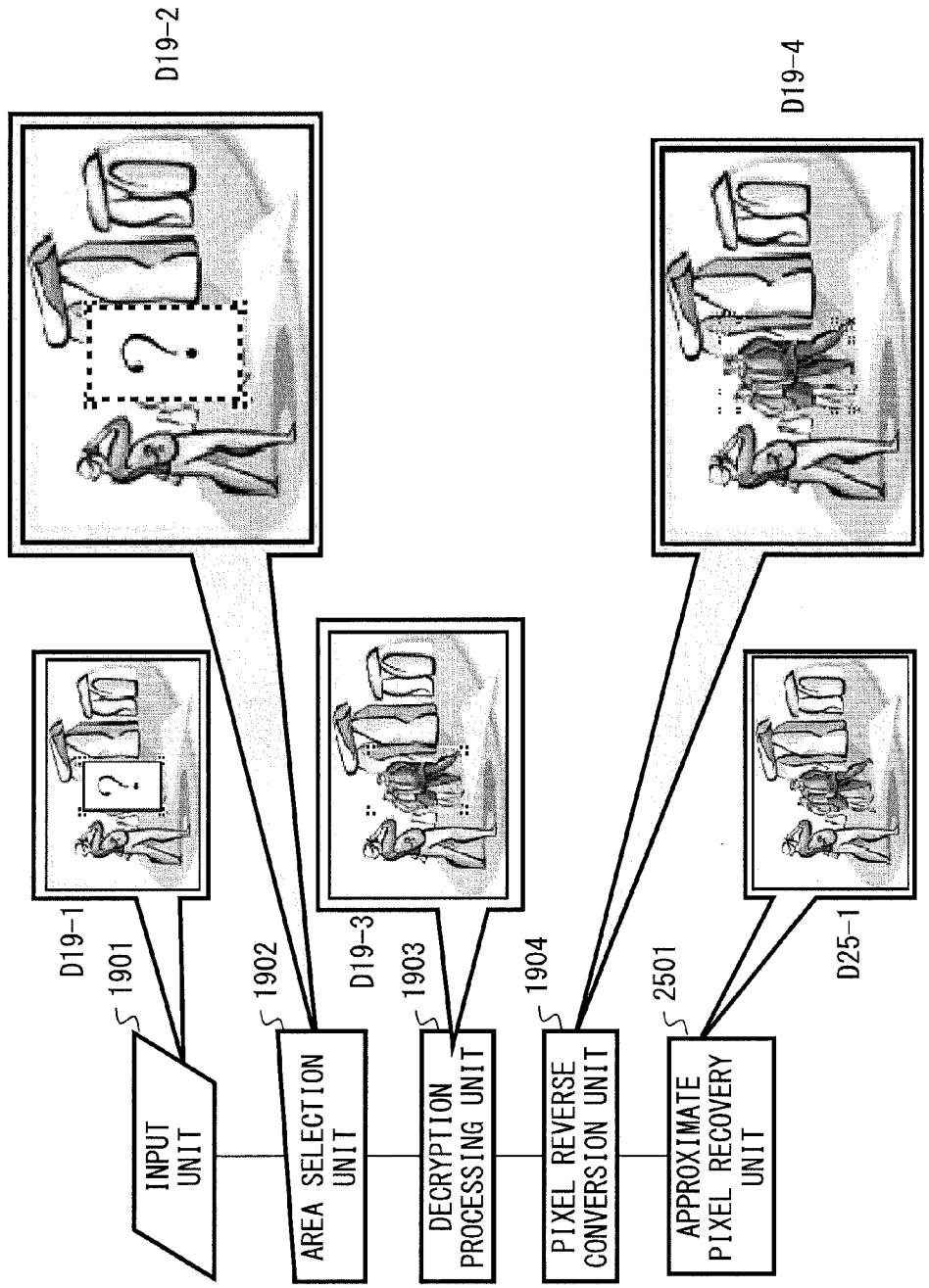
FIG. 25 is a configuration diagram of the second embodiment of the image decryption apparatus.
Figure 26:
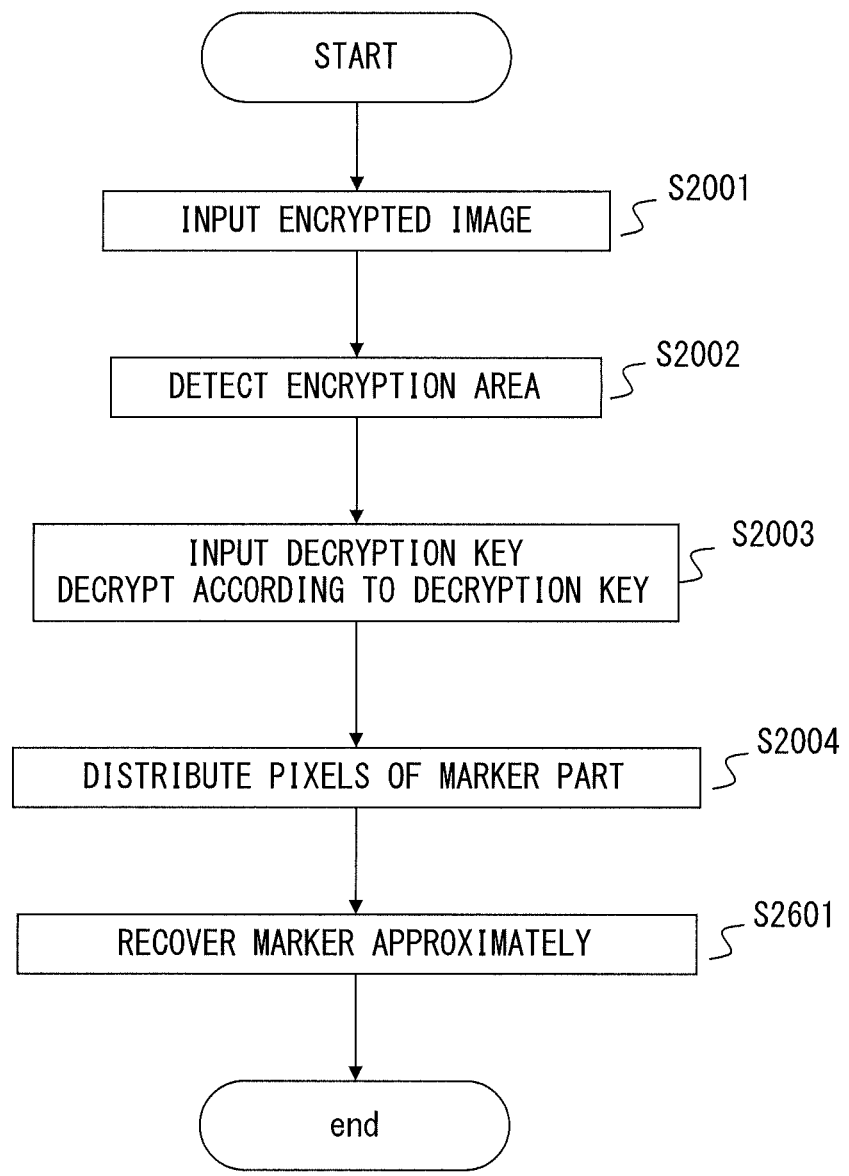
FIG. 26 is an operation flowchart illustrating the operation of the second embodiment of the image decryption apparatus.

FIG. 25 is a configuration diagram of the second embodiment of the image decryption apparatus. Meanwhile, FIG. 26 is an operation flowchart illustrating the operation of the second embodiment of the image decryption apparatus. In FIG. 25, the processing units or image examples to which the same numbers as in the first embodiment of the image decryption apparatus illustrated in FIG. 19 are assigned are the same as in FIG. 19. In addition, in FIG. 26, the processing steps to which the same numbers as in the operation flowchart in FIG. 20 are assigned are the same as in FIG. 20.

The second embodiment of the image decryption apparatus decrypts an encrypted image encrypted by the second embodiment of the image encryption apparatus illustrated in FIG. 17 and FIG. 18.

The second embodiment of the image decryption apparatus illustrated in FIG. 25 and FIG. 26 differs from the second embodiment of the image decryption apparatus illustrated in FIG. 19 and FIG. 20 in that the image recovery unit 1905 is replaced with an approximate pixel recovery unit 2501.

That is, in the second embodiment of the image decryption apparatus, after the process by the pixel reverse conversion unit 1904, the approximate pixel recovery unit 2501 in FIG. 25 executes an interpolation process using surrounding pixels of the pixels overwritten by the marker, as illustrated in FIG. 27 (step S2601 in FIG. 26). As a result, as illustrated in an image example D25-1 in FIG. 25, an image that does not completely match the image before the encryption but is approximately identical is obtained. As the interpolation process of pixels, for example, a method in which the average value of immediately above, right, below, left pixels (4-vicinity) of the interpolation target pixel is obtained may be applied.

Figure 28:
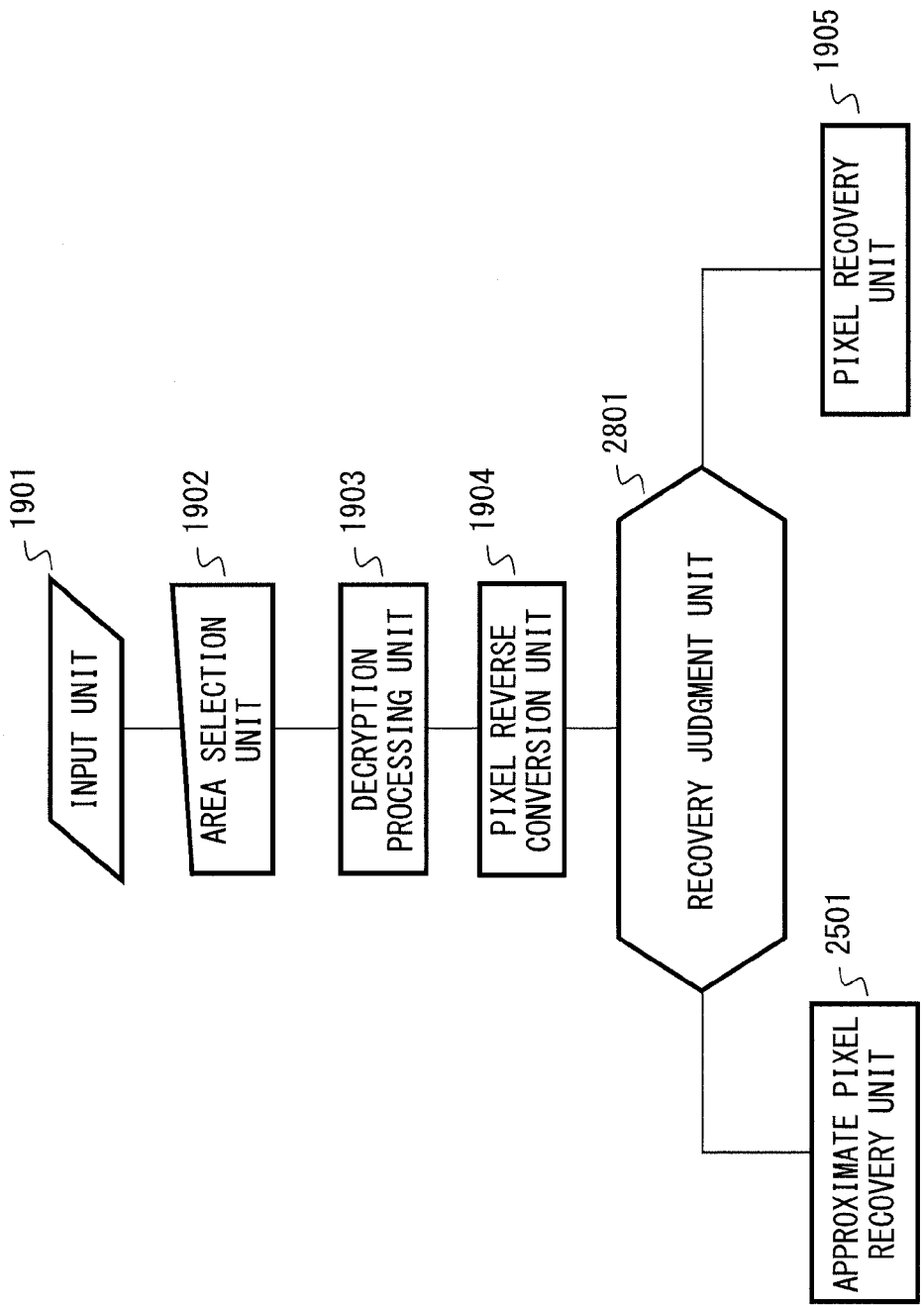
FIG. 28 is a configuration diagram of the third embodiment of the image decryption apparatus.
Figure 29:
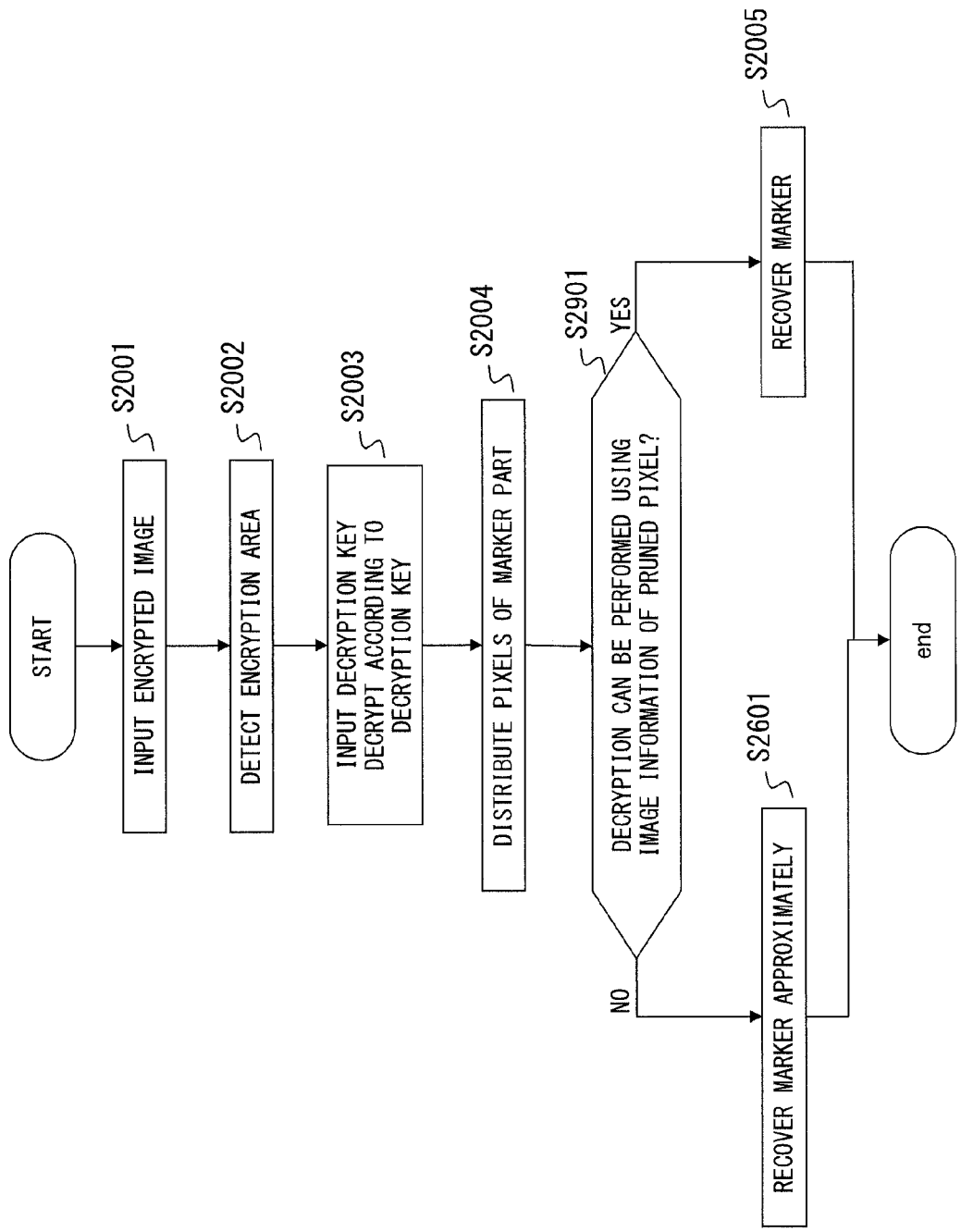
FIG. 29 is an operation flowchart illustrating the operation of the third embodiment of the image decryption apparatus.
Figure 30:
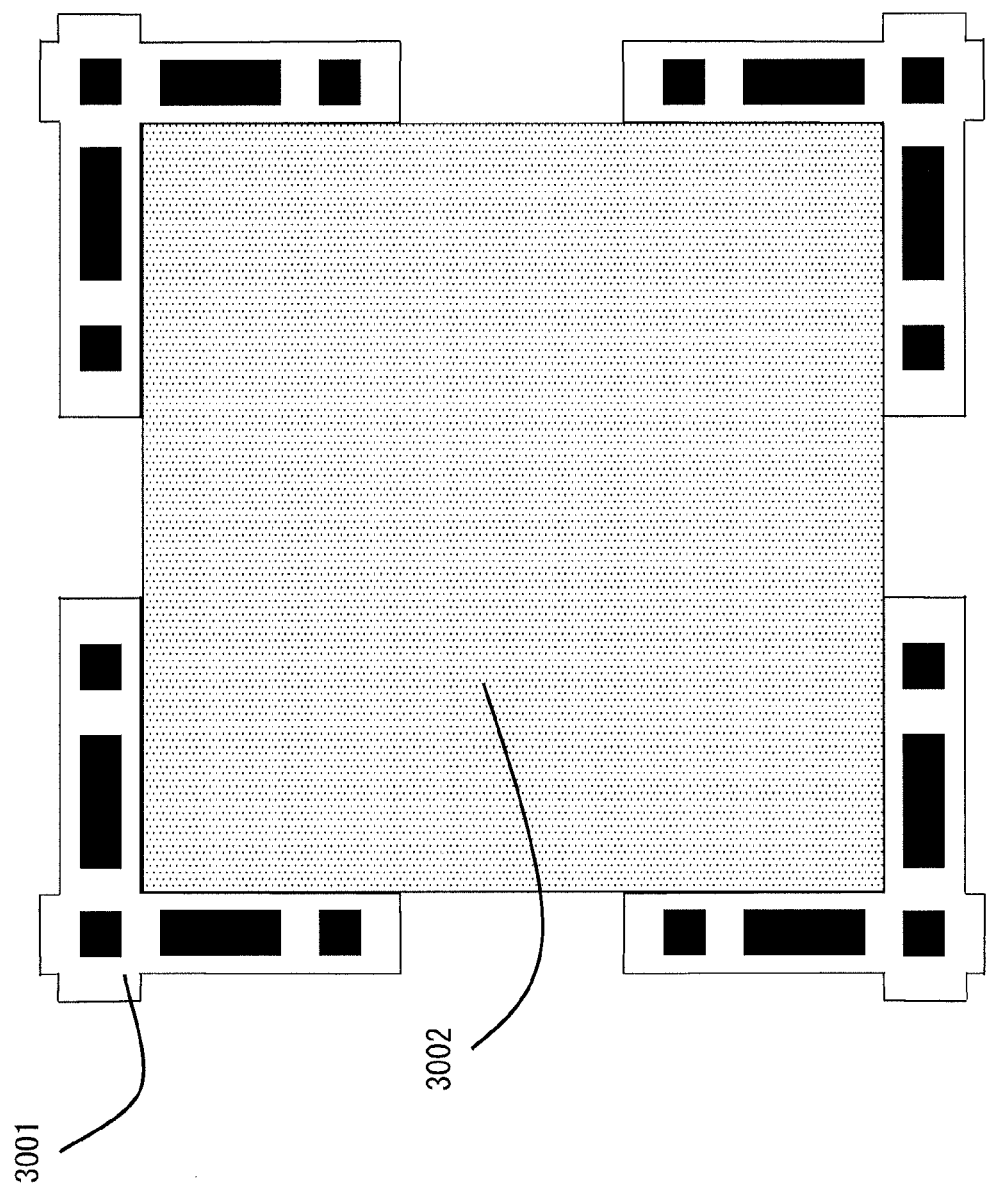
FIG. 30 is a diagram illustrating an area detection marker used as an example in detail explanation of a pixel pruning unit and a pixel conversion unit.

FIG. 28 is a configuration diagram of the third embodiment of the image decryption apparatus. Meanwhile, FIG. 29 is an operation flowchart illustrating the operation of the third embodiment of the image decryption apparatus. In FIG. 28, the processing units or image example to which the same numbers as in the first and second embodiments of the image decryption apparatus illustrated in FIG. 19 or FIG. 25 are the same as in FIG. 19 or FIG. 25. In addition, in FIG. 29, the processing steps to which the same numbers as in the operation flowcharts in FIG. 20 or FIG. 26 are the same as in FIG. 20 and FIG. 26.

In the third embodiment of the image decryption apparatus, after the process by the image conversion unit 1904, a recovery judgment unit in FIG. 28 may switch the process by the pixel recovery unit 1905 and the process by the approximate pixel recovery unit 2501. As a result, it becomes possible to switch the process in the first embodiment of the image decryption apparatus (FIG. 19, FIG. 20) according to the form of the input encrypted image data and the process in the second embodiment (FIG. 25, FIG. 26).

Here, the recovery judgment unit 2801 executes a judgment process as described below, to switch the process by the pixel recovery unit 1905 and the process by the approximate pixel recovery unit 2501 (step S2901 in FIG. 29).

That is, the recovery judgment unit 2801 for example judges whether or not pruned pixel information like the pixel information example D8-4 in FIG. 8 is included in the input image by the image saving unit 804 of the first embodiment of the image encryption apparatus. Then, if pruned pixel information is included, the recovery judgment unit 2801 lets the process by the pixel recovery unit 1905 (step S2005 in FIG. 29) executed. Meanwhile, if pruned pixel information is not included, the recovery judgment unit 2801 lets the process by the approximate pixel recovery unit 2501 (step S2601 in FIG. 29) executed.

Alternatively, the recovery judgment unit 2801 for example judges whether or not editing has been performed for the input image data, using CRC (Cyclic Redundancy Check). Then, if the recovery judgment unit 2801 determines that editing has been performed, it lets the process by the image recovery unit 1905 (step S2005 in FIG. 29) executed. Meanwhile, if the recovery judgment unit 2801 determines that no editing has been performed, it lets the process by the approximate pixel recovery unit 2501 performed (step S2601 in FIG. 29).

Hereinafter, the processes (steps S903, S905 in FIG. 9 or FIG. 18) by the pixel pruning unit 803 and the pixel conversion unit 805 (FIG. 8 or FIG. 17) in the first and second embodiments of the image encryption apparatus are described in detail.

The marker to be the target of attachment in the description below is supposed to be in an L-shape, having a pattern in which white/black rectangles are lined up vertically and horizontally according to a certain rule, which is surrounded by a white space having a certain width, and is attached to the four corners of an encryption area 3002 by the marker attachment unit 807 (FIG. 8 or FIG. 17).

Figure 31:
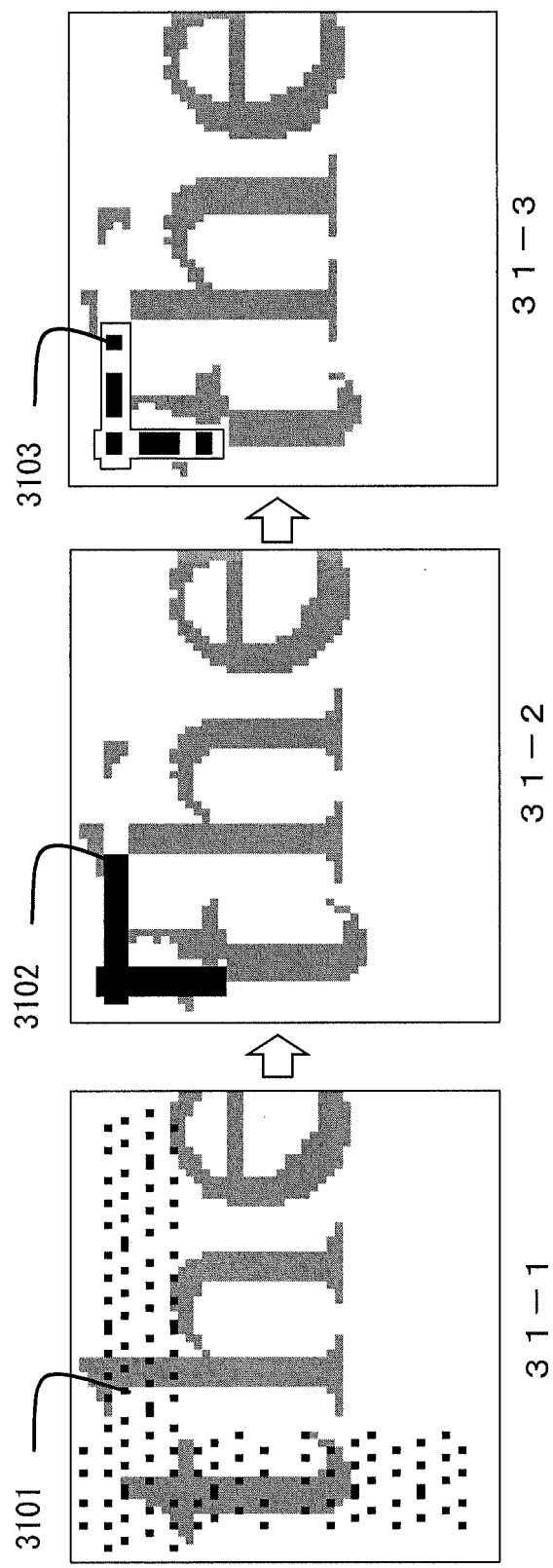
FIG. 31 is a diagram illustrating an example of an image generated in the series of processes in the pixel pruning unit, the pixel conversion unit and a marker attaching unit.

FIG. 31 illustrates an example of an image generated by a series of processing processes by the pixel pruning unit 803, the pixel conversion unit 805, the marker attachment unit 807. Meanwhile, in order to facilitate understanding, an example in which no encryption process is performed before the process before the marker attachment unit 807. In FIG. 31, as illustrated as 31-1, the positions 3101 to be pruned by the pixel pruning unit 803 are arranged in a manner distributed in a checkerboard pattern, as elaboration so that the image quality at the time of recovery by pixel interpolation does not deteriorate. The pruning positions 3101 are moved as a marker attachment position 3102. Then, as illustrated as 31-3, a marker 3103 for area detection is attached on the marker attachment position 3102 by the marker attachment unit 807.

As is understood from 31-2 in FIG. 31, among the positions of respective pixels in the image that has gone through the pixel pruning unit 803 and the pixel conversion unit 805, not only the pixels on the pruning positions but also many of pixels on the positions that are not pruned have moved. Considering a case in which an image deteriorated by printing, scanning and the like after encryption is decrypted, it is desirable that in the movement method of pixels on the positions that are not pruned, adjacent pixels in the original image are as close as possible after the move, and the decryption quality is improved with less discontinuous pixels. Hereinafter, a method to make adjacent pixels in the original image close after movement is described.

FIG. 32 is a diagram illustrating a procedure to move a pruning position P illustrated as 32-1 to the position of a pixel Q by the pixel conversion unit 805. As illustrated in 32-2, pixels A-G and Q between P and Q are shifted by one pixel in the direction of P, and conversion into an image as illustrated in 32-3 is performed. As a result, the pruning position P moves to the place where Q existed originally. In the example in FIG. 32, the pixels A-G are aligned in order of "right->below" from Q to P, but as long as they are pixels between P and Q, pixels on other paths (for example "below->right", "oblique") may be selected.

When the pixels A-G are left unchanged and the positions of P and Q are exchanged simply between P and Q, only one pixel Q is isolated from adjacent pixels in the original image, and may disappear with printing, scanning and the like. On the other hand, when pixel movement as in FIG. 32 is performed, no particular pixel is isolated after the move, making it possible to avoid image quality deterioration of the decrypted image.

Figure 33:
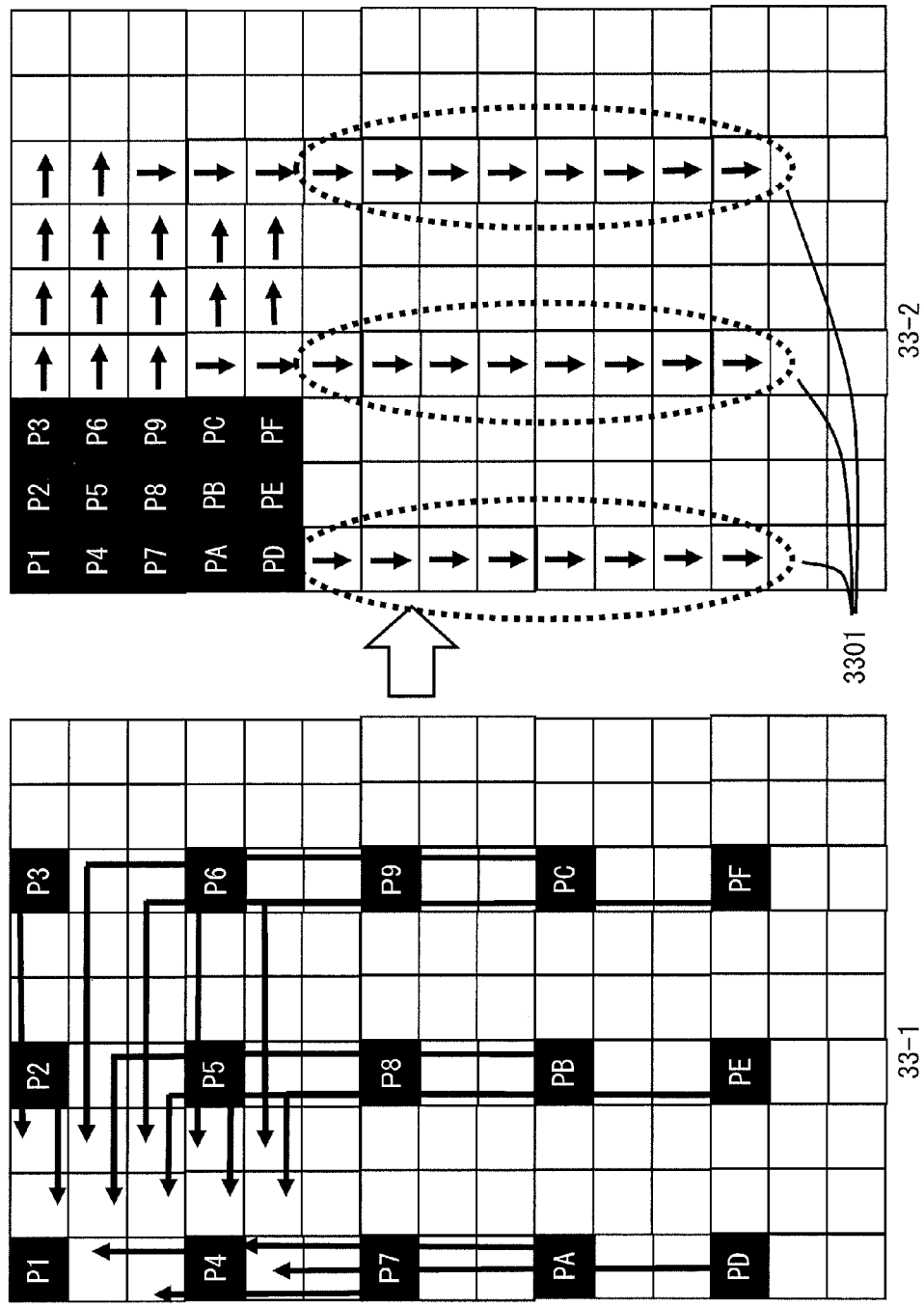
FIG. 33 is a diagram illustrating an example in which some parts having discontinuous pixels emerges after the move.
Figure 34:
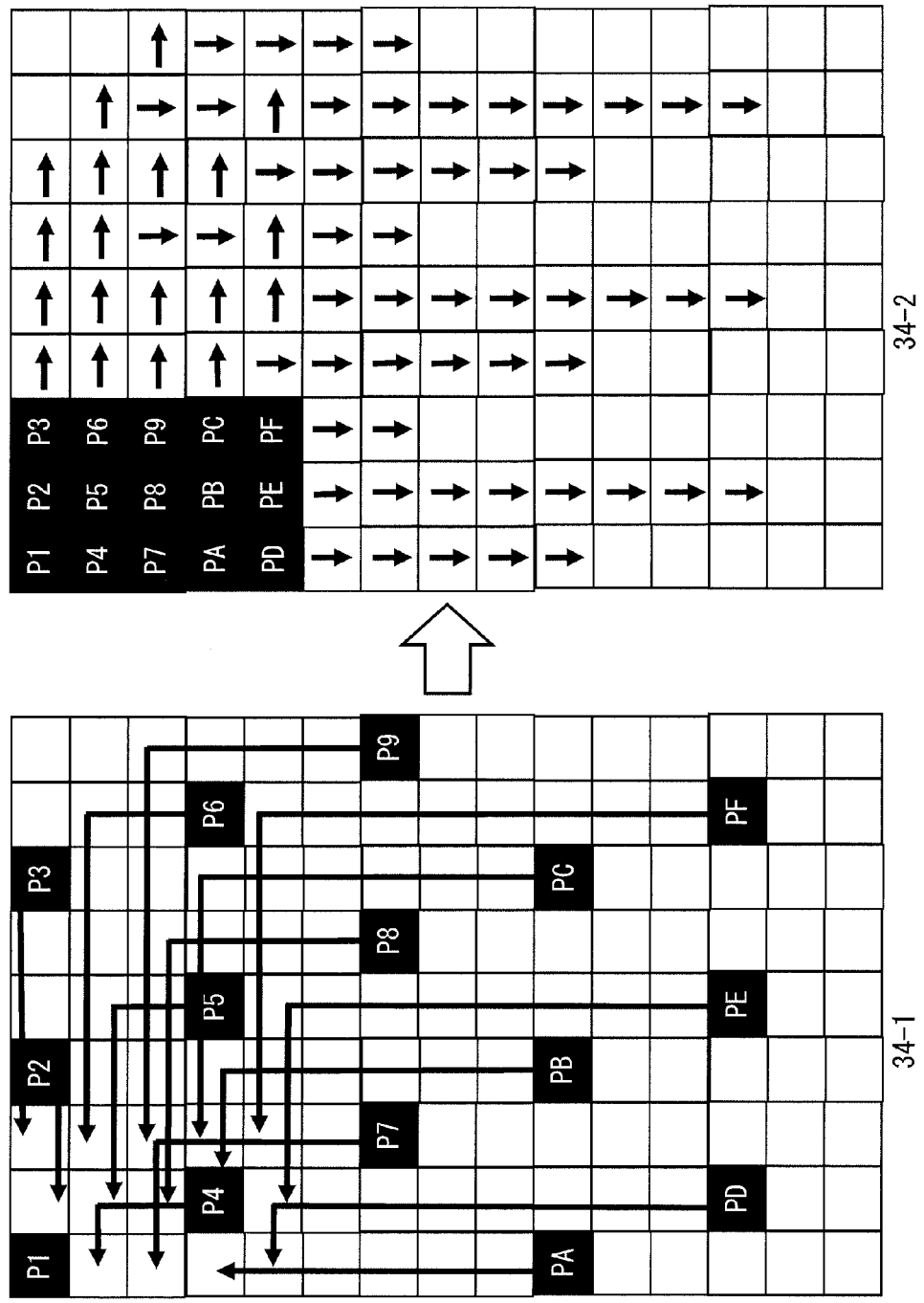
FIG. 34 is a diagram illustrating that, by elaborating the arrangement of the pruning positions in the pixel pruning unit, the parts having discontinuous pixels after the moving pixels are reduced compared with the image in FIG. 33.

FIG. 33 and FIG. 34 are examples in which the pixel movement is repeated at a plurality of pruning positions. It is assumed that at pruning positions illustrated in black as 31-1 and 34-1, pixels on respective arrows in the drawings are moved starting from P1 and in order of P2, P3, . . . , PE, PF, and are moved respective to the top left corner as 33-2, 34-2. Here, the arrows in 33-2 and 34-2 indicate the direction in which respective pixels moved after pixel movement.

FIG. 33 is an example in which pruning positions are arranged at a predetermined interval on the same lines vertically and horizontally and pixel movement was performed. In this case, as illustrated in 3301, there is a possibility that a particular pixel falls away from the original position and becomes discontinuous after the pixel movement, causing image deterioration when recovering the image by marker pixel interpolation. Therefore, as illustrated in FIG. 34, elaboration to shift the pruning positions in the horizontal direction in each horizontal line by one pixel is made. In the case of this arrangement, movement does not concentrate on particular pixels and are distributed to many pixels, and since pixels in the vicinity tend to move in the same direction, less parts are discontinuous after the movement. As a result, image quality deterioration at the time of image recovery can be reduced.

Discontinuous parts may be reduced by methods other than the one described above. For example, while leaving the arrangement of the pruning positions as in 33-1, a change may be made so that pixel movements (that is, respective arrows in 33-1) corresponding each pruning position do not concentrate on particular pixels. It goes without saying that there are many other pruning position selection and pixel movement methods that reduce discontinuous parts.

Figure 35:
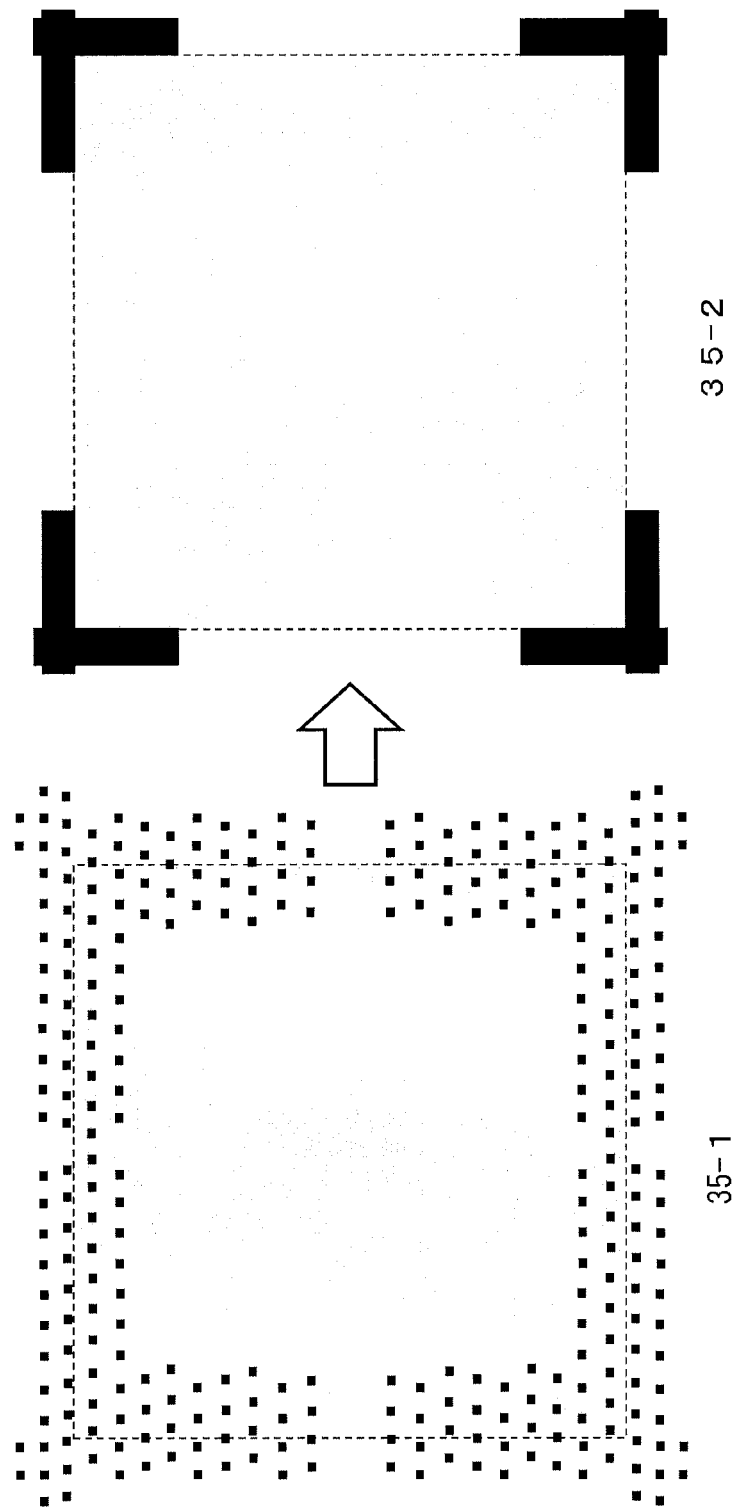
FIG. 35 is a diagram illustrating an example in which the process in the pixel pruning unit and the pixel conversion unit is performed in each of the four corners of the encryption area.

FIG. 35 is a schematic diagram illustrating an example in which the pruning position selection and pixel movement as in FIG. 34 are performed for the all marker attachment positions. The position indicated in black in 35-1 is the pruning position, and by the process by the pixel conversion unit, the pruning position and its surrounding pixels move as in 35-2.

The interval of the pruning positions arranged in a checkerboard pattern may be changed according to the size of the encryption area. For example, when the encryption area is small as in 36-1 in FIG. 36, if the pruning positions are specified with the same interval as in 35-1 in FIG. 35, the pruning positions overlap as in 3601 in 36-1, making pixel interpolation at the time of marker elimination difficult. Then, by narrowing the interval of the pruning positions as in 36-2, arrangement in which the pruning positions do not overlap can be made.

Hereinafter, the pruning position arrangement and pixel movement method illustrated in FIG. 35 and FIG. 36 illustrated above is referred to as the "method 1".

Figure 37:
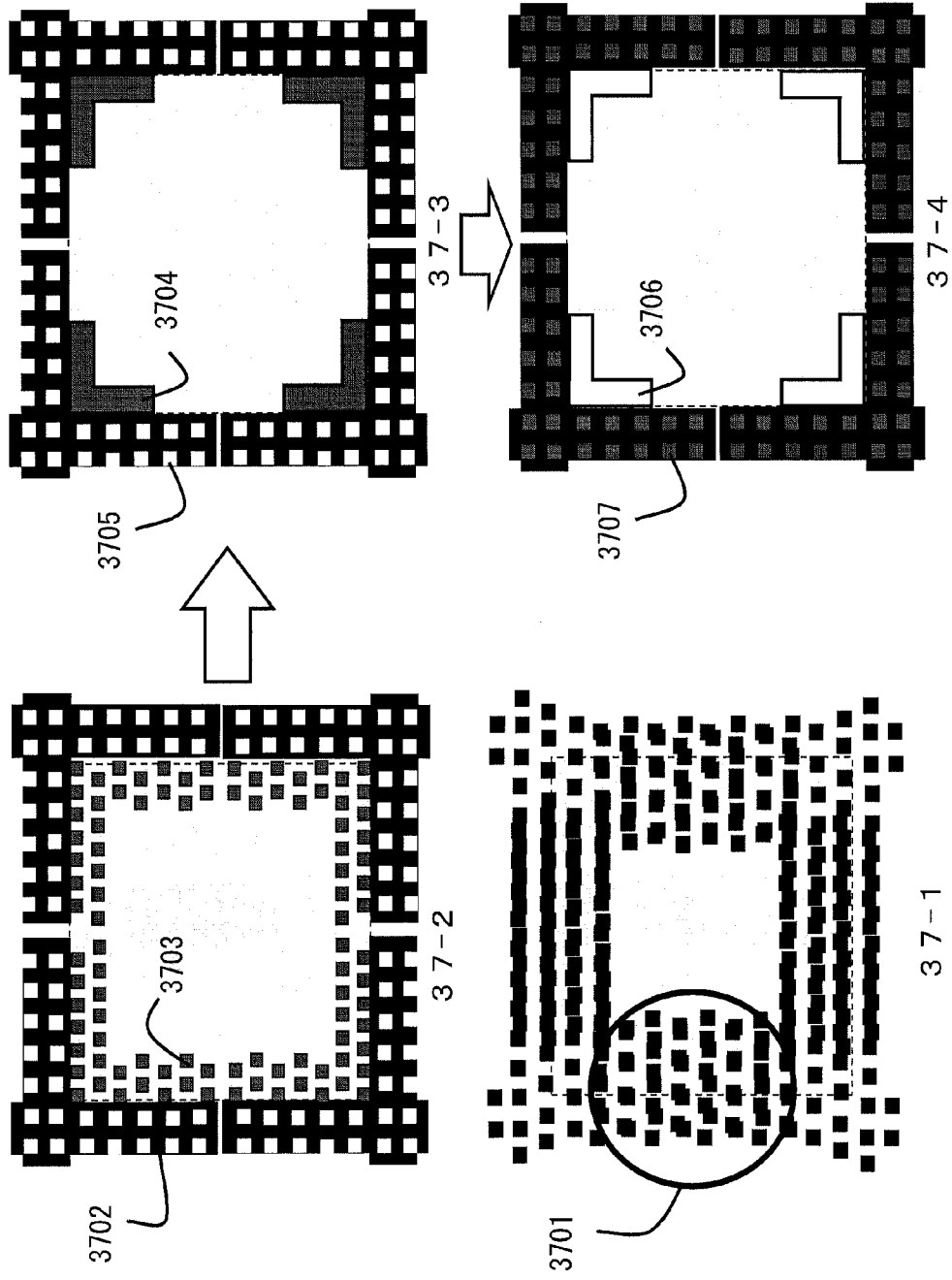
FIG. 37 is a diagram illustrating an example in which, when the encryption area is even smaller than the area in FIG. 36, the arrangement method of the pruning positions in the pixel pruning unit are changed inside and outside the marker attachment positions.

As illustrated in 37-1 in FIG. 37, when the encryption area is smaller, even if the interval of the pruning positions is minimized (while retaining the checkerboard pattern arrangement), overlap occurs as in 3701. Therefore, in this case, the pruning position arrangement method and the ratio of pruning are made different in the area to which the marker is attached and in the other area. An arrangement example is illustrated in 37-2. In the area to which the marker is attached, as in a black area 3702, many pruned pixels are selected, and in the area to which the marker is not attached, as in 3703, pixels to be pruned are selected in a checkerboard pattern by the same method as in FIG. 35 and FIG. 36.

According to the arrangement rule above, a pruning position 3703 is moved to the four corners in the encryption area first as illustrated in 3704 in 37-3. The pixel movement method is the same as the one explained in FIG. 32. Next, each pixel 3705 that is not pruned in the marker attachment area is moved to the pruning position 3704. As a result, as in 37-4, the pruning position 3704 is moved to the position 3707 to which the marker is attached, and pixels in the marker attachment area are moved to 3706 just in a scaled down form.

Hereinafter, the pruning position arrangement and pixel movement method illustrated in FIG. 37 illustrated above is referred to as the "method 2".

In the above method for the case in which the encryption area is very small, since many pixels are pruned from the marker attachment area, recovery image quality at the time of pixel interpolation deteriorates in the area. However, in the area to which no marker is attached (encryption area), pixels are pruned in a checkerboard pattern and without overlap by the same method as in FIG. 35 and FIG. 36, making it possible to minimize the degradation of recovery image quality at the time of pixel interpolation. If there is a need to avoid degradation of recovery image quality in the area to which the marker is attached, for example, the arrangement of the pruning positions may be moved further towards the outer side of the encryption area, so that the pruning positions do not overlap with a checkerboard pattern arrangement.

Methods for selecting positions of pruned pixels and pixel movement are not limited to the methods described above, and various combinations may be applied according to the size of the area, the shape of the marker, and required recovery image quality.

Hereinafter, the processing flow of the pixel pruning unit 803, the pixel conversion unit 805 is described. First, the following variables are defined.

- x1: x coordinate of the left end of the four corner marker placed on top left
- y1: y coordinate of the top end of the four corner marker placed on top left
- x2: x coordinate of the left end of the encryption target area
- y2: y coordinate of the top end of the encryption target area
- W1: width from x1 to the center x coordinate of the encryption area
- H1: height from y1 to the center y coordinate of the encryption area
- W2: width from x1 to the right end of the four corner marker (top left)
- H2: height from y1 to the bottom end of the four corner marker (top left)
- W3: width from x2 to the center x coordinate of the encryption area
- H3: height from y2 to the center y coordinate of the encryption area
- Dw: horizontal interval of pruning positions in method 1
- Dh: vertical interval of pruning positions in method 1
- Dw': horizontal interval of pruning positions 3703 in the encryption area in method 2
- Dh': vertical interval of pruning positions 3703 in the encryption area in method 2
- Ew: horizontal interval of pixel positions 3705 that are not pruned in the marker attachment area in method 2
- Eh: vertical interval of pixel positions 3705 that are not pruned in the marker attachment area in method 2

Figure 38:
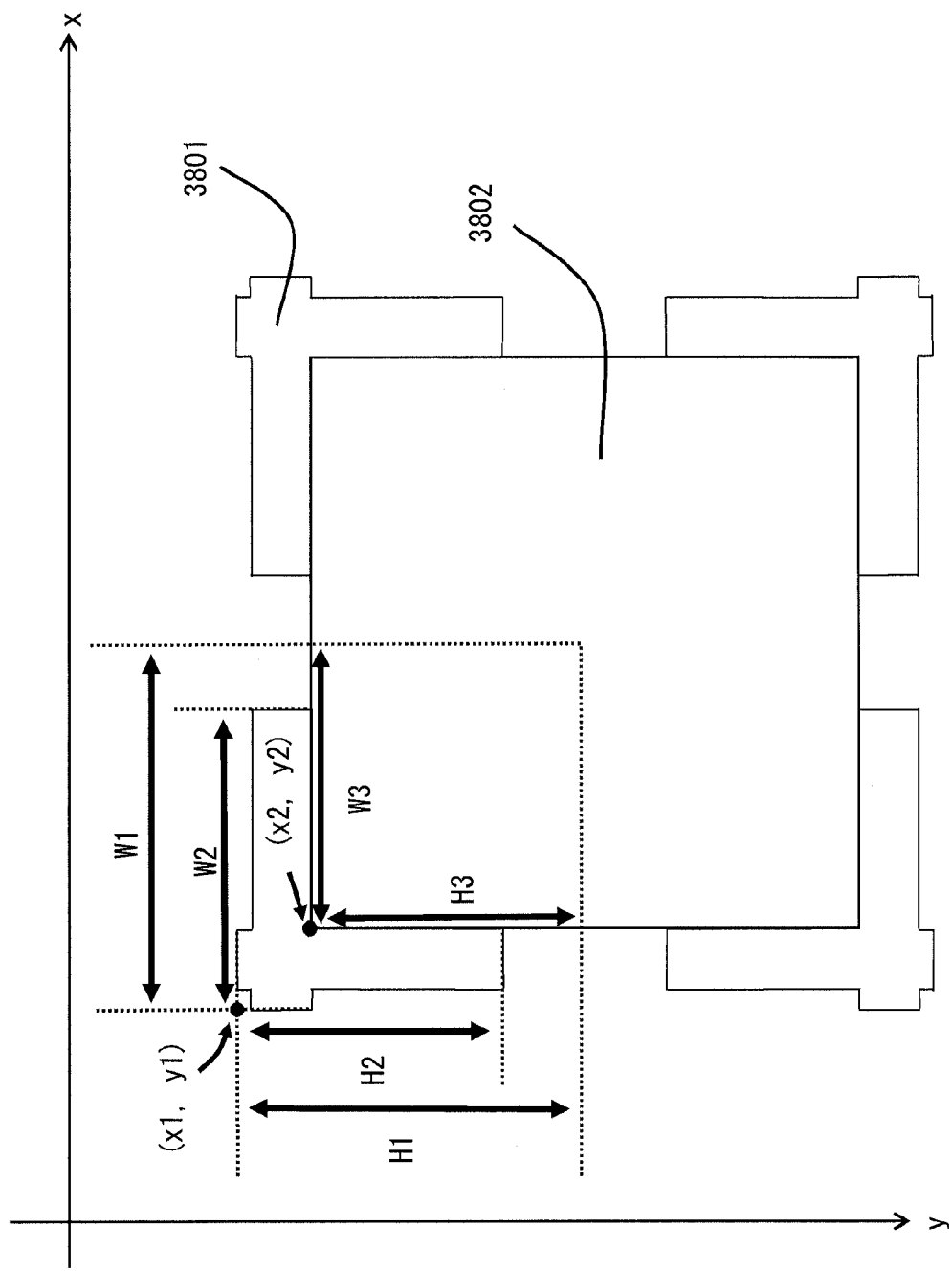
FIG. 38 is a diagram illustrating valuables used in the process flow in the pixel pruning unit and the pixel conversion unit.

Meaning of each variable is illustrated in FIG. 38. In FIG. 38, 3801 corresponds to the four corner marker and 3802 corresponds to the encrypted area.

Figure 39:
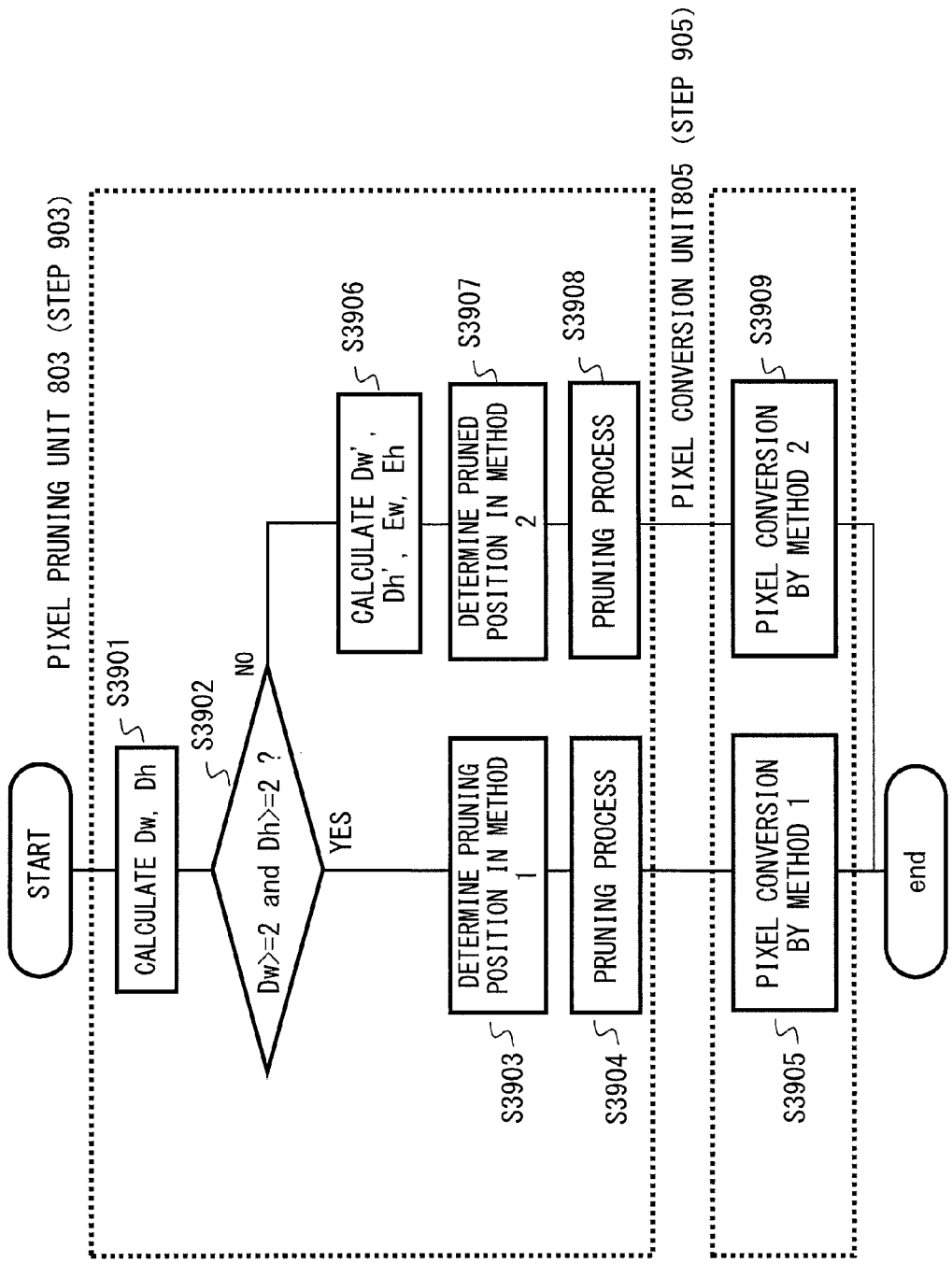
FIG. 39 is an operation flowchart illustrating details of the process in the pixel pruning unit and the pixel conversion unit.

Using these variables, the process flow of the pixel pruning unit 803, the pixel conversion unit 805 is illustrated in the operation flowchart in FIG. 39.

First, in step S3901, the horizontal interval Dw and the vertical interval Dh of the pruning positions in the case in which method 1 is used are calculated from the following equations.

$$Dw = \min(W1/W2, U) \quad (1)$$

$$Dh = \min(W1/W2, U) \quad (2)$$

Here, U represents the upper limit of the pruning interval, and min(a,b) represents the calculation to calculate the smaller value of a and b.

In next step S3902, whether both Dw and Dh are smaller than 2. When both of the values are smaller than 2, adjacent pruning positions come into contact in some parts with method 1, making it impossible to make arrangement in which all the pruning positions are apart. For example, when Dw is 1.5, three horizontally adjacent pruning positions are X, X+1.5, X3.0 in this order, assuming the x coordinate of the left end as X. They are rounded to integers as X, X+2, X+3, respectively, where the two right pruning positions are stuck, and the interpolation accuracy from surrounding pixels deteriorates. Therefore, in the branching judgment in step S3902, only when both Dw and Dh are equal to or more than 2, the processes (step S3903-S3905) related to method 1 are performed, and when this is not satisfied, the processes (steps S3906-S3909) are performed.

Figure 40:
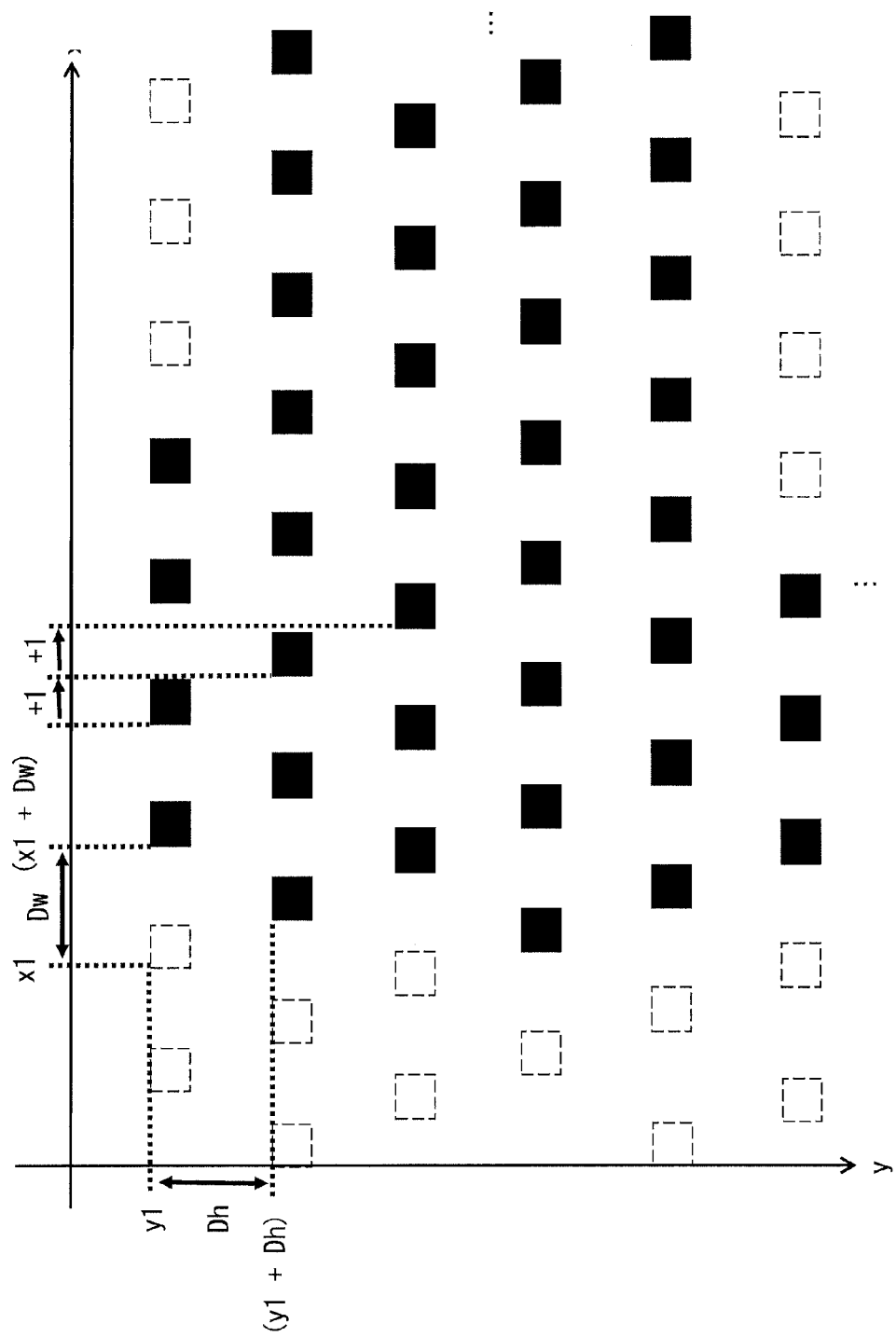
FIG. 40 is a diagram illustrating a method to determine the pruning positions in step S3903 in FIG. 39.

Hereinafter, based on FIG. 40, the arranging method of pruning positions in step S3903 is explained. First, with the top left position (x1, y1) of the marker as reference, pruning position candidates (the white square enclosed by broken lines and the black square in FIG. 40) are lined up in a horizontal one line at the interval Dw. In its immediately-below line, the pruning position candidates are arranged while being kept apart by the interval Dh in the vertical direction, and further being shifted to the right in the horizontal direction by 1. Thereafter, in the lines under it, pruning position candidates are arranged while being shifted by Dh in the vertical direction and to the right by 1 in the horizontal direction from the immediately-above line. From these pruning position candidates, the pruning positions (the black square in FIG. 40) corresponding to the pruning positions after pixel conversion are selected. Specifically, the closest pruning position candidate from each pixel position when a pruning positions placed on the marker attachment position after pixel conversion are arranged while being spread at an interval of Dw to the right and at and interval of Dh to the bottom with (x1, y1) as reference.

In the pruning process in step S3904 in FIG. 39, the pixels on the pruning positions determined in step S3903 are pruned.

In next step S3905, each pruning position is moved to the marker attachment position by raster scanning in top-left to bottom-right order. The movement method of each pruning position is realized in the same manner as illustrated in FIG. 34, where movement is performed first in the upward direction (vertical direction) to make the y coordinates of the marker attachment position equal, and movement is performed in the leftward direction (horizontal direction).

The pruning position arrangement and pixel conversion before marker attachment for the remaining three corners are performed in the same manner as in the method described above, with symmetric coordinates (for example, the process for the top right part is symmetric with that for the top left part with respect to the y-axis).

Details of the process in method 1 are as described above.

Next, the processes (steps S3906-S3909) related to method 2 are described.

First, in step S3906, the horizontal interval Dw' and the vertical interval Dh' of the pruning positions 3703 in the encryption area and the horizontal interval Ew and the vertical interval Eh of the pixel positions 3705 that are not pruned in the marker attachment area in method 2 are calculated from the following equations.

$$Dw' = \min(\max(2 \times W3/W2, 2), U) \quad (3)$$

$$Dh' = \min(\max(2 \times H3/H2, 2), U) \quad (4)$$

$$Ew = \max(2 \times W2/W3, 2) \quad (5)$$

$$Eh = \max(2 \times H2/H3, 2,) \quad (6)$$

Here, max(a, b) represents the calculation to calculate the larger value of a and b. In equations (3) and (4), setting is made so that Dw' and Dh' are not equal to or smaller than 2, to prevent adjacent pruning positions 3703 from being stuck to each other.

After calculating these four variables, in step S3907, the pruning position arrangement process in method 2 is performed.

First, the arrangement method of the pixel positions 3705 that are not pruned in the marker attachment area is explained using FIG. 41. As illustrated in FIG. 41, the checkerboard positions (squares enclosed by solid lines and broken lines in FIG. 41) in which, with the top left position (x1, y1) of the marker as reference, position intervals are expanded by Ew in the horizontal direction and by Eh by the vertical direction is considered. Among these, pixels (squares enclosed by solid lines in FIG. 41) included in the marker attachment position (the gray area in FIG. 41) are assumed as pixel positions that are not pruned. Pixels other than them indicated in gray in FIG. 41 are assumed as the pruned pixels 3702.

Figure 42:
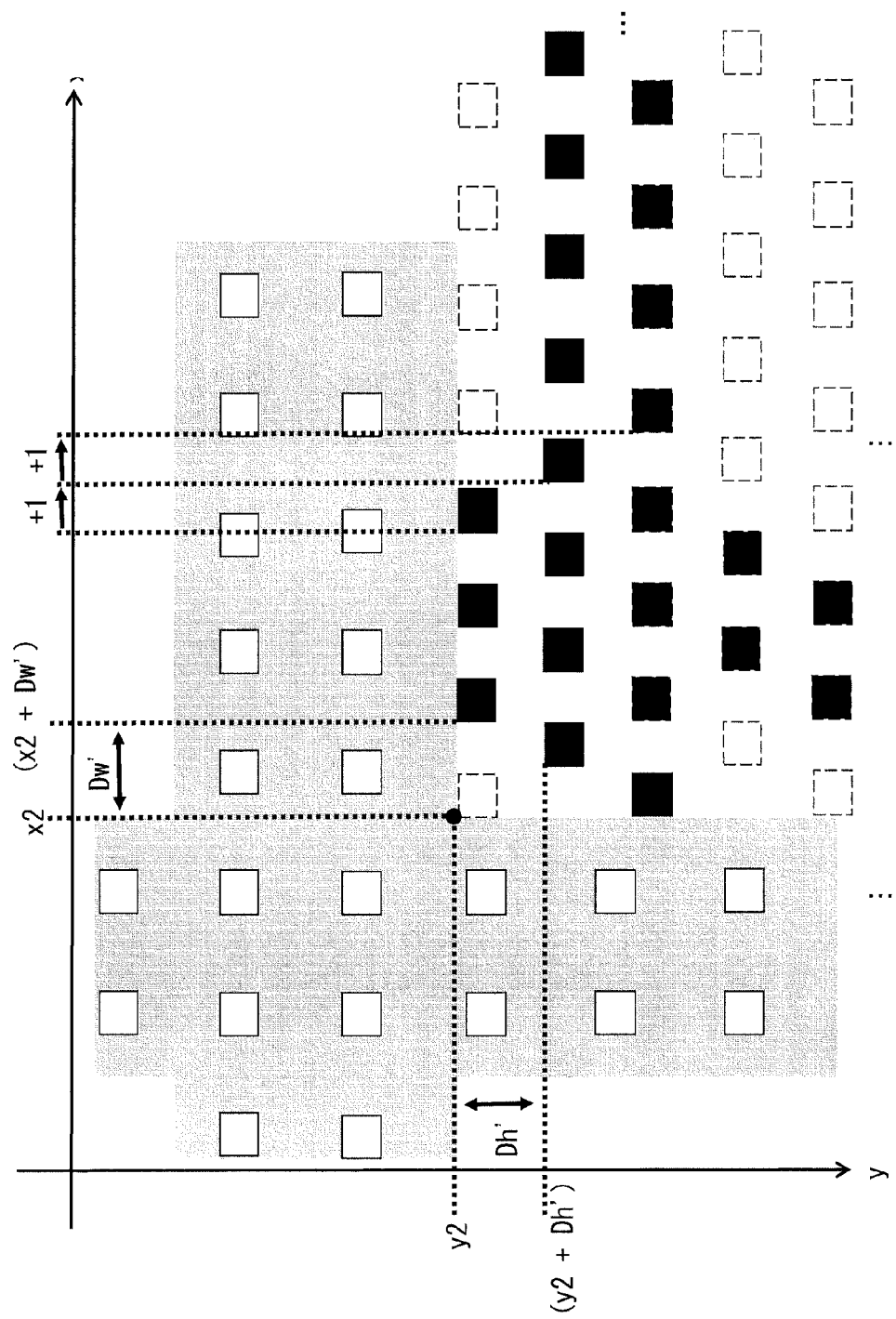
FIG. 42 is a diagram illustrating a method to determine pruning positions in the encryption area in step S3907 in FIG. 39.

Next, the determination method of pruning positions 3703 in the encryption area is explained using FIG. 42. First, with the top left position (x2, y2) of the encryption area as reference, pruning positions candidates (white squares enclosed by broken lines and black squares in FIG. 42) are lined up in one horizontal line at an interval of Dw'. In its immediately-below line, the pruning position candidates are arranged while being kept apart by the interval Dh' in the vertical direction, and further being shifted to the right in the horizontal direction by 1. Thereafter, in the lines under it, in the same manner, pruning position candidates are arranged while being shifted by Dh' in the vertical direction and to the right by 1 in the horizontal direction from the immediately-above line.

From the calculated pruning position candidates, the pruning positions 3703 (black squares in FIG. 42) are determined. Specifically, the closest pixel from each pixel position in the case in which the pruning positions 3704 that are densely arranged on the top left corner of the encryption area after pixel conversion are arranged while being spread at an interval of Dw' to the right and at an interval of Dh' to the bottom with (x2, y2) as reference. As explained already in FIG. 37, since the pruning positions 3703 are moved to the pixel positions 3705 which are not pruned in the marker attachment area at a last stage, it is needed to correspond both in one to one manner.

In the pruning process in step S3908, pixels on the pruning positions determined in step S3907 are pruned.

In the next step S3909, based on the determined pruning positions determined in step S3907, pixel conversion is performed by the method explained using FIG. 37, and the pruning positions are moved to the marker attachment area.

As for the order of moving the pruning positions 3703 to the position 3704, in the same manner as the pixel conversion in method 1, raster scanning in top-left to bottom-right order is performed for each pruning position. The movement method of each pruning position is realized in the same manner as illustrated in FIG. 34, where movement is performed first in the upward direction (vertical direction) to make the y coordinates of the marker attachment position equal, and movement is performed in the leftward direction (horizontal direction). Further, the pixel conversion by method 2 is completed with the pixels 3705 that are not pruned being moved to the pruning position 3704.

The pruning position arrangement and pixel conversion before marker attachment for the remaining three corners are performed in the same manner as in the method described above, with symmetric coordinates.

Details of the process in method 2 are as described above.

Hereinafter, the process (step S2004 in FIG. 20, FIG. 26 or FIG. 29) by the image reverse conversion unit 1904 (FIG. 19, FIG. 25 or FIG. 28) is described in detail.

Figure 43:
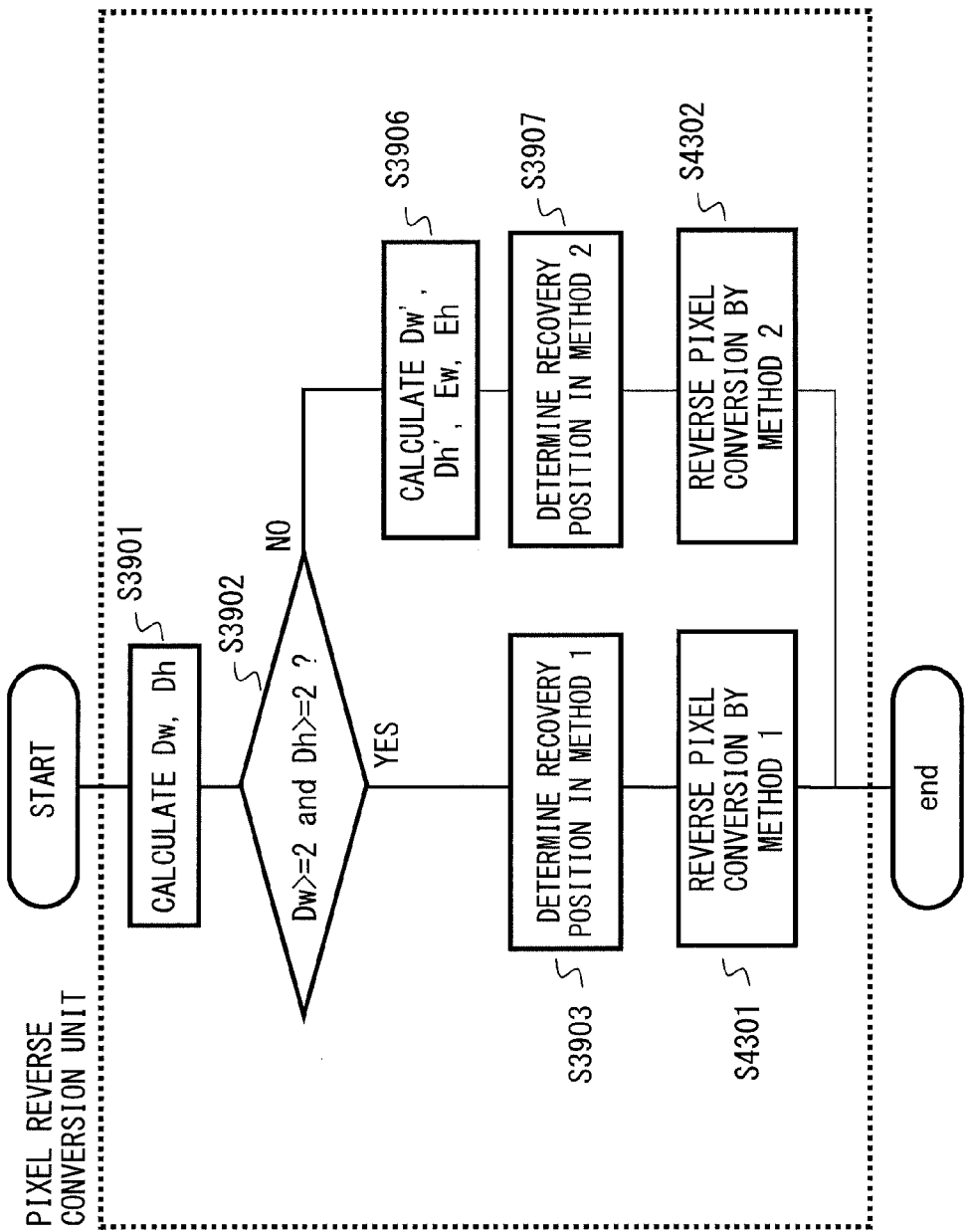
FIG. 43 is an operation flowchart illustrating details of the process in the pixel reverse conversion unit.

The process flow in this part is represented in the operation flowchart in FIG. 43. The meaning of the variable used here is the same as in the processing flow of the pixel pruning unit 803 and the pixel conversion unit 805. In addition, processes other than the pixel reverse conversion process (step S4301, S4302) are the same as the processes (step S3901-S3903, S3906, S3907) by the pixel pruning unit 803 illustrated in FIG. 39, and description for them is omitted.

Pixel reverse conversion (step S4301, S4302) in method 1 and method 2 respectively is performed in the reverse procedure of the pixel conversion (step S3902, S3909) in FIG. 39. As a result, each pixel of the four corner marker move to the pruning position determined by the pixel pruning unit 803, and becomes the target of recovery by header information or interpolation using surrounding pixels.

In the first and second embodiment of the image encryption apparatus and the first through third embodiments of the image decryption apparatus, at the time of marker attachment (at the time of encryption), pixels overwritten by the marker are selected and pruned in a distributed manner, the pruning positions are moved to the marker attachment position and the marker is attached to the marker attachment position. At the time of marker elimination (at the time of decryption), each pixel of the marker is moved to the original position before the marker attachment, each moved pixel of the marker is recovered, and the marker is eliminated. In this case, it is the best if each moved pixel of the marker can be recovered from evacuated image information, as in the first embodiment of the image encryption apparatus and the first embodiment of the image decryption apparatus. On the other hand, when there is no evacuated information as in the second embodiment of the image encryption apparatus and the second embodiment of the image decryption apparatus, each moved pixel of the marker is to be interpolated from surrounding pixels. In this case, in each embodiment, since pixels overwritten by the marker are selected and pruned in distributed manner, it becomes possible to avoid degradation of image quality after interpolation by marker attachment as illustrated in FIG. 6 and FIG. 7.

In addition, in the third embodiment of the image decryption apparatus, it becomes possible to select a decryption method with best quality at the time of decryption, by determining presence/absence of evacuated information to change the decryption method.

FIG. 44 is a diagram illustrating an example of the hardware configuration of a computer that is capable of realizing the first or second embodiment of the image encryption apparatus and the first or second embodiment of the image decryption apparatus.

The computer illustrated in FIG. 44 has a CPU 4401, a memory 4402, an input apparatus 4403, an output apparatus 4404, an external storage apparatus 4405, a portable recording medium driving apparatus 4406 to which a portable recording medium 4409 is inserted, and a network connection apparatus 4407, and has a configuration in which there are connected to each other by a bus 4408. The configuration illustrated in the drawing is an example of a computer that is capable of realizing the system described above, and such a computer is not limited to this configuration.

The CPU 4401 performs control of the entire computer. The memory 4402 is a memory such as RAM and like that temporarily stores a program or data stored in the external storage apparatus 4405 (or the portable recording medium 4409) at the time of program execution, data update and the like. The CUP 4401 performs the overall control by reading out and executing the program on the memory 4402.

The input apparatus 4403 comprise, for example, a keyboard, a mouse, and the like and their interface control apparatus. The input apparatus 4403 detects an input operation by the keyboard, the mouse and like by the user and sends notification of the detection result to the CPU 4401.

The output apparatus 4404 comprises a display apparatus, a printing apparatus and the like and their interface control apparatus. The output apparatus 4404 outputs data sent by the control by the CPU 4401 to the display apparatus and the printing apparatus and the like.

The external storage apparatus 4405 is a hard disc storage apparatus for example. It is mainly used for saving various data and programs.

The portable recording medium driving apparatus 4406 accommodates the portable storage medium 4409 such as an optical disk, a compact flash (registered trademark) and the like, and has an auxiliary role of the external storage apparatus 4405.

The network connection apparatus 4407 is an apparatus to connect a communication line of LAN (local area network) or WAN (wide area network).

The system according to each embodiment described above is realized with the CPU 4401 executing a program required to it in which functions to realize the operation illustrated in each flowchart in FIG. 9, FIG. 18, FIG. 20, FIG. 26, FIG. 39, FIG. 43 are mounted. The program may be distributed while being recorded on the external storage apparatus 4405 and the portable recording medium 4409, or may be obtained by the network by the network connection apparatus 4407.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An image encryption apparatus comprising:
an input unit from which document data is input; and
a processor that:
selects an encryption target area to be encrypted in an image obtained from the document data;
determines pruning positions in the image;
shifts pixels at the pruning positions to positions within a particular area which is included in the image and is located at a corner of the encryption target area;
encrypts the encryption target area;
overwrites the pixels shifted from the pruning positions to the positions within the particular area in the image, with a marker; and
outputs the image in which the encryption target area has been encrypted and the pixels shifted from the pruning positions to the positions within the particular area have been overwritten by the marker.

2. The image encryption apparatus according to claim 1, wherein
the processor determines to arrange the pruning positions at predetermined intervals in the image.

3. The image encryption apparatus according to claim 1, wherein
the processor determines the pruning positions according to a size of the encryption target area.

4. The image encryption apparatus according to claim 1, wherein
according to a size of the encryption target area, the processor determines an interval between two of the pruning positions within the particular area and an interval between two of the pruning positions outside the particular area.

5. The image encryption apparatus according to claim 1, wherein
the processor shifts certain pixels that are not at any of the pruning positions and that are included in the particular area, to another area in the image so as to scale down an arrangement of the certain pixels in the particular area.

6. The image encryption apparatus according to claim 5, wherein pixels at positions which are some of the pruning positions and are outside the particular area are shifted to positions within the particular area to substitute for the certain pixels shifted from the particular area.

7. The image encryption apparatus according to claim 1, wherein pixel positions to which the pixels originally at the pruning positions are shifted are pixel positions just covered by the marker.

8. The image encryption apparatus according to claim 1, wherein
at least one of the pruning positions is within the particular area and at least one of the pruning positions is outside the particular area,
the processor further shifts a plurality of other pixels which are at positions different from the pruning positions and are included within the particular area, to positions outside the particular area, and
the marker is identical to the particular area in size and shape.

9. The image encryption apparatus according to claim 1, wherein
a plurality of pixels on a path from a first position to a second position are shifted along the path,
the second position is one of the pruning positions; and
the first position is a position to which a pixel at the second position is to be shifted.

10. An image decryption apparatus comprising:
an input unit from which encrypted data including an image is input; and
a processor that:
detects an encryption area which is included in the image and is indicated by a marker in the image;
decrypts the encryption area;
shifts certain pixels located within the marker in the image, to pruning positions which are included in the image and are determined depending on the encryption area and the marker;
recovers the certain pixels; and
outputs the image in which the encryption area has been decrypted and the certain pixels have been recovered and arranged at the pruning positions.

11. The image decryption apparatus according to claim 10, wherein
the processor recovers the certain pixels by an interpolation process using other pixels.

12. The image decryption apparatus according to claim 10, wherein
when pixel information of pixels at the pruning positions is available, the processor recovers the certain pixels by using the pixel information, and the processor recovers the certain pixels by an interpolation process using other pixels when the pixel information is not available.

13. An image encryption method to encrypt document data, the image encryption method comprising:
inputting the document data;
selecting, by a processor, an encryption target area to be encrypted in an image obtained from the document data;
determining, by the processor, pruning positions in the image;
shifting, by the processor, pixels at the pruning positions to positions within a particular area which is included in the image and is located at a corner of the encryption target area;
encrypting, by the processor, the encryption target area;
overwriting, by the processor, the pixels shifted from the pruning positions to the positions within the particular area in the image, with a marker; and
outputting the image in which the encryption target area has been encrypted and the pixels shifted from the pruning positions to the positions within the particular area have been overwritten by the marker.

14. An image decryption method comprising:
inputting encrypted data including an image;
detecting, by a processor, an encryption area which is included in the image and is indicated by a marker in the image;
decrypting, by the processor, the encryption area;
shifting, by the processor, certain pixels located within the marker in the image, to pruning positions which are included in the image and are determined depending on the encryption area and the marker;
recovering, by the processor, the certain pixels; and
outputting the image in which the encryption area has been decrypted and the certain pixels have been recovered and arranged at the pruning positions.

15. A non-transitory storage medium storing a program for making a computer execute a process comprising:
inputting document data;
selecting an encryption target area to be encrypted in an image obtained from the document data;
determining pruning positions in the image;
shifting pixels at the pruning positions to positions within a particular area which is included in the image and is located at a corner of the encryption target area;
encrypting the encryption target area;
overwriting the pixels shifted from the pruning positions to the positions within the particular area in the image, with a marker; and
outputting the image in which the encryption target area has been encrypted and the pixels shifted from the pruning positions to the positions within the particular area have been overwritten by the marker.

16. A non-transitory storage medium storing a program for making a computer execute a process comprising:
inputting encrypted data including an image;
detecting an encryption area which is included in the image and is indicated by a marker in the image;
decrypting the encryption area;
shifting certain pixels located within the marker in the image, to pruning positions which are included in the image and are determined depending on the encryption area and the marker;
recovering the certain pixels; and
outputting the image in which the encryption area has been decrypted and the certain pixels have been recovered and arranged at the pruning positions.

* * * * *